United States Patent [19]
Sugiura et al.

[11] Patent Number: 5,999,509
[45] Date of Patent: Dec. 7, 1999

[54] OPTICAL PICKUP DEVICE WITH TWO INDEPENDENT LIGHT BEAMS AND AN INTEGRATED PRISM FOR PROVIDING RETURN LIGHT WITH ASTIGMATISM

[75] Inventors: Satoshi Sugiura; Akihiro Tachibana; Yoshihisa Kubota, all of Tsurugashima, Japan

[73] Assignee: Pioneer Electronic Corporation, Tokyo, Japan

[21] Appl. No.: 09/022,521

[22] Filed: Feb. 12, 1998

[30] Foreign Application Priority Data

Mar. 19, 1997 [JP] Japan .................................. 9-066953

[51] Int. Cl.⁶ .............................. G02B 13/00; G11B 7/00
[52] U.S. Cl. .................. 369/112; 369/44.23; 369/44.37; 369/94
[58] Field of Search ............................. 369/44.23, 44.37, 369/44.38, 112, 44.41, 103, 116, 121, 109, 94, 118

[56] References Cited

U.S. PATENT DOCUMENTS

| | | | |
|---|---|---|---|
| 5,105,407 | 4/1992 | Ishika | 369/44.37 |
| 5,293,366 | 3/1994 | Ohta | 369/44.31 |
| 5,615,200 | 3/1997 | Hoshino | 369/112 |
| 5,761,176 | 6/1998 | Takahashi | 369/109 |

FOREIGN PATENT DOCUMENTS 7-98431  4/1995  Japan .

*Primary Examiner*—Tan Dinh
*Assistant Examiner*—Kim-Kwok Chu
*Attorney, Agent, or Firm*—Finnegan, Henderson, Farabow, Garrett & Dunner, L.L.P.

[57] ABSTRACT

An optical pickup or an optical head capable of favorably irradiating a plurality of independent different light beams and receiving return light with a simple structure. The optical pickup is composed of a beam emitting unit for supplying at least two independent light beams, a common light converging optical system for converging the light beams from the beam emitting unit to a recording medium, an integrated prism for guiding each of the light beams from the beam emitting unit incident thereto to the light converging optical system and for providing return light from the recording medium incident thereto with astigmatism, and a light receiving element for receiving the return light provided with astigmatism by the prism.

16 Claims, 17 Drawing Sheets

FIG.12 OPTIMAL VALUES

|  | LD1 | LD2 |
|---|---|---|
| RA | 0.3 | 0.0 |
| RB | 1.0 | 0.5 |

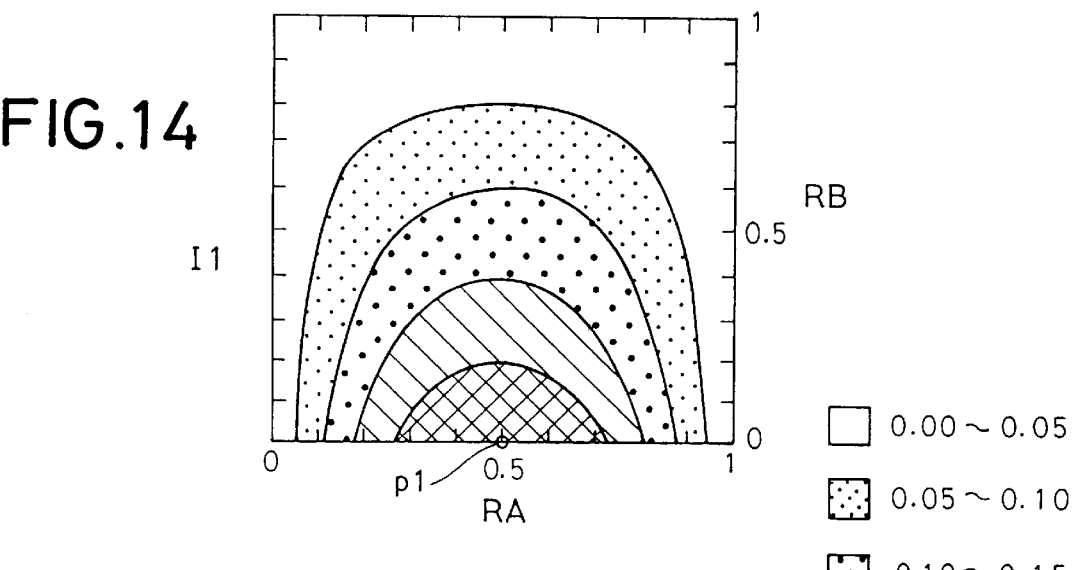
FIG.14
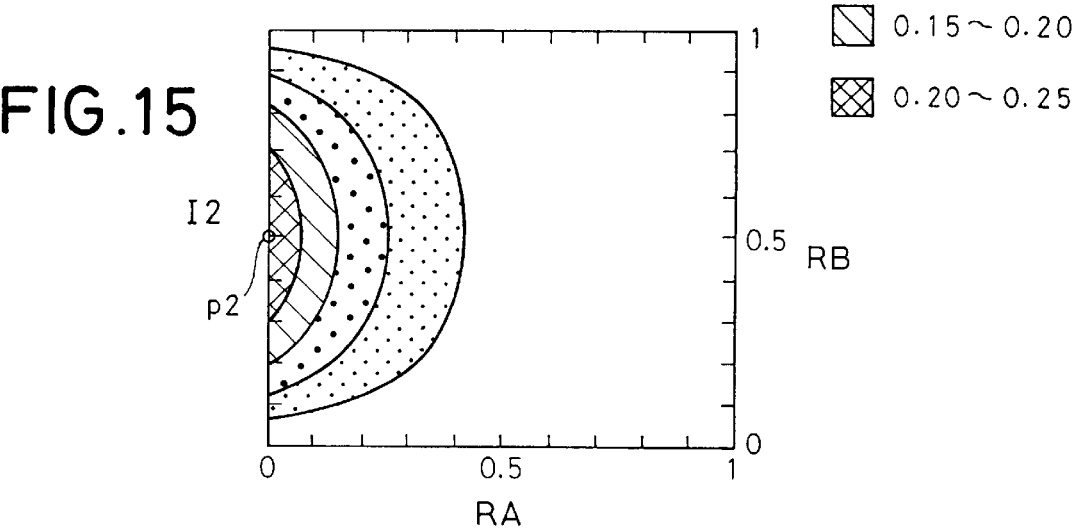
FIG.15
FIG.16
| OPTIMAL VALUES | | LD1 | LD2 |
|---|---|---|---|
| | RA | 0.5 | 0.0 |
| | RB | 0.0 | 0.5 |

FIG.22

|     | LD1 | LD2 | LD3 |
| --- | --- | --- | --- |
| RA  | 0.5 | 0.0 | 0.0 |
| RB  | 0.0 | 0.5 | 0.0 |
| RC  | 0.0 | 0.0 | 0.5 |

2

1

OPTICAL PICKUP DEVICE WITH TWO INDEPENDENT LIGHT BEAMS AND AN INTEGRATED PRISM FOR PROVIDING RETURN LIGHT WITH ASTIGMATISM

BACKGROUND OF THE INVENTION

1. Field of the Invention

The present invention relates to an optical pickup device, and particularly to an optical head.

2. Description of Related Art

A variety of optical discs such as those called LD (Laser Disc), CD (Compact Disc), and DVD (Digital Video Disc) are known as optical information recording media. These optical discs are separately standardized in accordance with different specifications for requirements such as the thickness of a substrate. For instance, in a multi-layer structured optical disc included in the DVD specifications, each recording layer has a different effective thickness of the optical disc. In addition, the different optical discs also require different optimal numerical apertures (NA) for optical lenses for reading information therefrom.

While there is a need for a compatible player which is capable of reading recording information from either of CD and DVD, an optical system for reading CD differs from an optical system for reading DVD in the following aspects:

(1) Difference in Numerical Aperture NA: 0.6 for DVD versus 0.45 for CD;

(2) Difference in Thickness of Substrate from Optical Disc Surface to Recording (Reflecting) Surface: 0.6 mm for DVD versus 1.2 mm for CD; and (3) Difference in Wavelength of Optimal Reading Light: 650 nm for DVD versus 780 nm for CD.

It is therefore necessary to absorb these differences in specifications for realizing an optical pickup for a CD/DVD compatible player.

To realize such a compatible player, it is often thought to be convenient to employ an objective lens having two focuses in an optical pickup. Specifically, an objective lens having a single focus is not suitable because an optimal numerical aperture for one optical disc is not appropriate for the other optical disc, and employment of an inappropriate disc will result in the generation of aberration such as spherical aberration or the like.

An example of realizing a two-focus pickup has already been known (Japanese Patent Application Kokai No. 7-98431) in which a hologram lens is employed. This two-focus pickup has a composite objective lens formed of an objective lens 1 and a hologram lens 2, as illustrated in FIGS. 1 and 2. The hologram lens 2 is formed with a plurality of concentric diffraction grooves 3 extending over a region corresponding to a numerical aperture for CD. The diffraction grooves 3 deflects a light beam from a light source to split the light beam into zero-order diffracted light and first-order diffracted light to provide them with different incident angles to the objective lens 1, thereby focusing the light beam on a recording surface of each optical disc as required. In this event, the optical beam as it is transmits a region of hologram lens 2 without the diffraction grooves 3 and is converged by the objective lens 1 together with the zero-order diffracted light, so that the transmitted light as well as the zero-order diffracted light and the first-order diffracted light cause a change in numerical aperture. The first-order diffracted light diffracted by the diffraction grooves 3 and having a smaller numerical aperture is utilized for reading a CD 4 as illustrated in FIG. 1, while the transmitted light and the zero-order diffracted light having a larger numerical aperture is utilized for reading a DVD 5 as illustrated in FIG. 2.

Basically, the foregoing structure forms the reading spots with a single light source, and generally uses a light source which emits a reading light having a wavelength of 650 nm appropriate to the DVD. However, appropriate light for reading recordable and reproducible recording media called CD-R (CD Recordable, or R-CD: Recordable CD) belonging to a CD family is 780 nm in wavelength. In other words, the light at wavelength of 650 nm is not appropriate for reading information recorded on a CD-R. Therefore, it can be said that, to realize a compatible player capable of favorably recording and reproducing information on and from a disc such as the CD-R, it is safer to provide a modified structure for an optical pickup or a head having a plurality of light sources for emitting light at different wavelengths appropriate to the respective discs, instead of the structure employing a single light source for emitting light at a single wavelength. However, an easily designed optical system having a plurality of light sources would result in an optical pickup or a head which tends to have a more complicated structure and a larger size as a whole.

OBJECTS AND SUMMARY OF THE INVENTION

Therefore, the present invention has been made in view of the problem mentioned above, and its object is to provide an optical pickup or an optical head which is capable of irradiating a plurality of independent different light beams and receiving return light in a simple structure to support a variety of information recording media.

An optical pickup device according to the present invention is characterized by comprising beam emitting means for supplying at least two independent light beams, a common light converging optical system for converging the light beams from the beam emitting means to a recording medium, an integrated prism for guiding each of the light beams incident thereto from the beam emitting means to the light converging optical system substantially without aberration, and providing return light incident thereto from the recording medium with astigmatism, and light receiving means for receiving the return light provided with astigmatism by the prism.

In the optical pickup set forth above, the prism may satisfy to have at least two input surface corresponding to each of the light beams from the beam emitting means, to which these light beams are incident, and an output surface from which the return light provided with astigmatism is emitted, wherein one of the input surfaces is formed proximal to the light converging optical system, the other of the input surfaces is formed on the side opposite to the light converging optical system, and the output surface is formed proximal to the light converging optical system, and the one and the other of the input surfaces are not in parallel with each other. In addition, the one of the input surfaces and the output surface may be arranged at an angle to form a ridge shape. Further, the optical pickup device may be arranged such that one of the light beams from the beam emitting means is reflected on the one of the input surfaces and guided to the light converging optical system, the other of the light beams from the beam emitting means transmits the other of the input surfaces and is guided to the light converging optical system, and the return light is reflected on the other of the input surfaces, transmits the output surface, and is guided to the light receiving element.

Also, in the aforementioned optical pickup device, the prism may satisfy to have at least two input surfaces corresponding to each of the light beams from the beam emitting means, to which these optical beams are incident, and an output surface from which the return light provided with astigmatism is emitted, wherein the one and the other of the input surfaces are formed proximal to the light converging optical system, and the output surface is formed on the side opposite to the light converging optical system, and the one of the input surface and the output surface are not in parallel with each other. Also, the one and the other of the input surfaces may be arranged at an angle to form a ridge shape. Further, the optical pickup device may be arranged such that one of the light beams from the beam emitting means is reflected on the one of the input surfaces and is guided to the light converging optical system, the other of the light beams from the beam emitting means transmits the other of the input surfaces, is reflected on the output surface, transmits the one of the input surfaces, and is guided to the light converging optical system, and the return light transmits the one of the input surfaces and the output surface and is guided to the light receiving element.

Further, in the aforementioned optical pickup device, the prism may satisfy to have at least two input surfaces corresponding to each of the light beams emitted from the beam emitting means, to which these light beams are incident, and an output surface from which the return light provided with astigmatism is emitted, wherein the one and the other of the input surfaces are formed proximal to the light converging optical system, and the output surface is formed on the side opposite to the light converging optical system, and the one and the other of the input surfaces are arranged at an angle to form a valley shape. It is also possible that one of the light beams from the beam emitting means is reflected on the one of the input surfaces and guided to the light converging optical system, the other of the light beams from the beam emitting means transmits the other of the input surface, is reflected on the output surface, transmits the one of the input surfaces, and is guided to the light converging optical system, and the return light transmits the one of the input surfaces and the output surface and is guided to the light receiving element.

Further, in the aforementioned optical pickup device, the prism may be devised to include a first optically transparent body having a single input surface to which each of the beams from the beam emitting means is incident, and positioned proximal to the light converging optical system, and a second optically transparent body having an output surface from which the return light provided with astigmatism is emitted, positioned on the side opposite to the light converging optical system, and coupled to the first optically transparent body on a surface opposite to the output surface, wherein the coupled surfaces of the first optically transparent body and the second optically transparent body are not in parallel with the input surface and the output surface. In addition, the device may be devised that one of the light beam from the beam emitting means is reflected on the input surface and guided to the light converging optical system, the other of the light beams from the beam emitting means transmits the input surface, is reflected on the coupled surfaces, transmits the input surface, and is guided to the light converging optical system, and the return light transmits the input surface, the coupled surfaces, and the output surface, and is guided to the light receiving element.

Further, in the aforementioned optical pickup device, the prism may be devised to include a first optically transparent body having at least two input surfaces corresponding to each of the light beams from the beam emitting means, to which these light beams are incident, and positioned proximal to the light converging optical system, and a second optically transparent body having an output surface from which the return light provided with astigmatism is emitted, positioned on the side opposite to the light converging optical system, and coupled to the first optically transparent body on a surface opposite to the output surface. In addition, the input surface may comprise first, second, and third input surfaces orderly formed adjacent to one another, wherein the first input surface and the second input surface are arranged at an angle to form a ridge shape, and the second input surface and the third input surface are arranged at an angle to form a valley shape. It is also possible that a first light beam from the beam emitting means is reflected on the first input surface corresponding thereto and guided to the light converging optical system, a second light beam from the beam emitting means transmits the second input surface corresponding thereto, is reflected on coupled surfaces of the first optically transparent body and the second optically transparent body, transmits the first input surface, and is guided to the light converging optical system, a third light beam from the beam emitting means transmits the third input surface corresponding thereto and the coupled surfaces, is reflected on the output surface, transmits the coupled surfaces and the first input surface, and is guided to the light converging optical system, and the return light transmits the first input surface, the coupled surfaces, and the output surface, and is guided to the light receiving element.

In addition, in the respective aspects described above, it is desired that the prism is defined with optical characteristics such that the light receiving means receives each of the light beams from the beam emitting means substantially at a maximum level of intensity.

BRIEF DESCRIPTION OF THE DRAWINGS

FIG. 12 is a table listing optimal values for reflectivities;

FIGS. 14 and 15 are graphs respectively illustrating a light intensity distribution on a light receiving element for explaining how the optical characteristics are selected for surfaces of the modified wedge-shaped prism in FIG. 13;

FIG. 16 is a table listing optimal values for reflectivities;

FIG. 22 is a table listing optimal results of the optical characteristics on the surfaces of the modified wedge-shaped prism in FIG. 19.

DESCRIPTION OF THE PREFERRED EMBODIMENTS

Embodiments of the present invention will hereinafter be described in detail with reference to the accompanying drawings.

Figure 3:
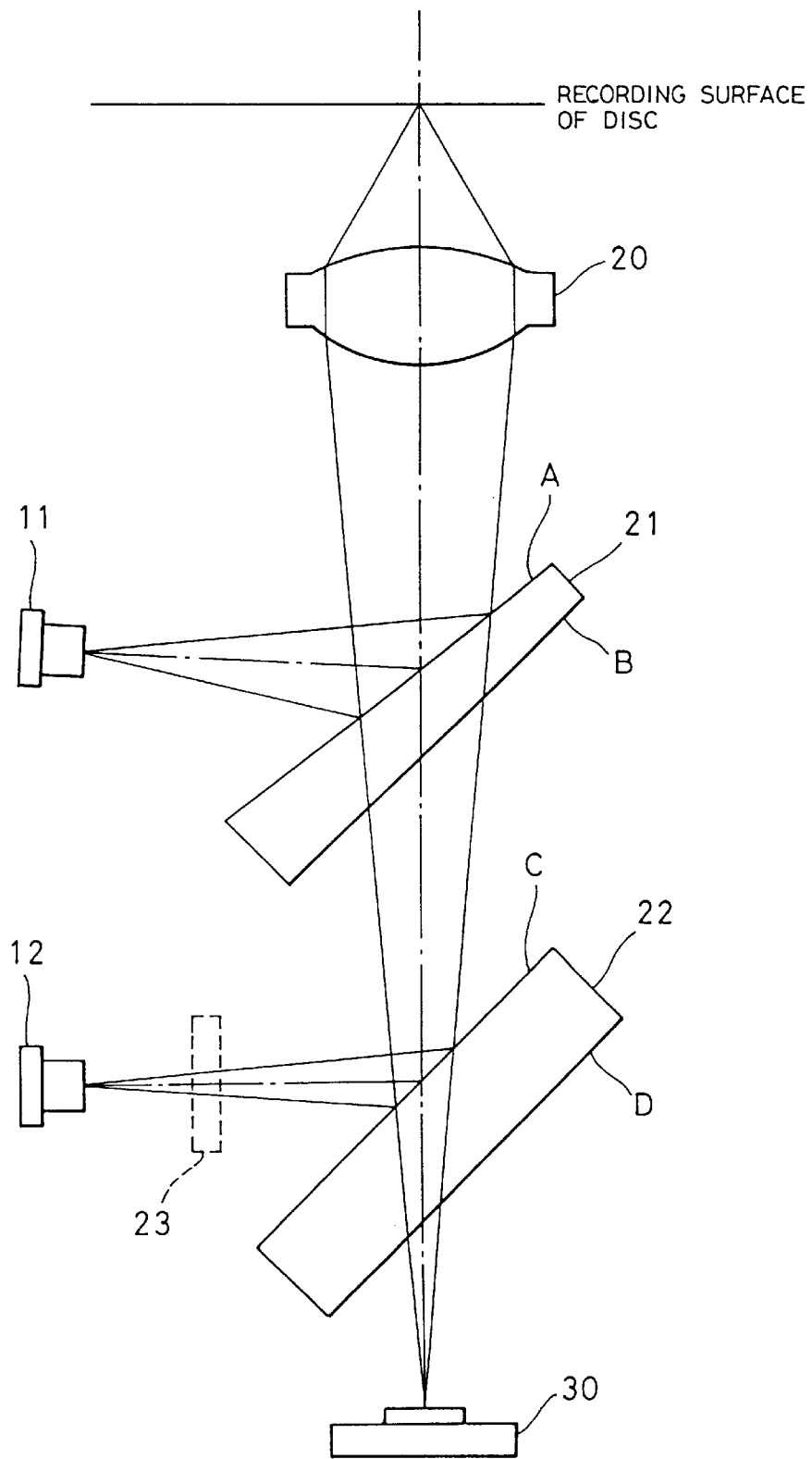
FIG. 3 is a schematic diagram illustrating a general structure of an optical head device based on the basic principles of the present invention.

FIG. 3 illustrates an example of a general structure of an optical head device based on the basic principles of the present invention.

Referring specifically to FIG. 3, an optical head device or a pickup device is provided with a first laser diode (LD1) 11 for emitting a light beam, for example, at a wavelength of 650 nm appropriate for reading a DVD, and a second laser diode (LD2) 12 for emitting a light beam, for example, at a wavelength of 780 nm appropriate for reading a CD as well as for writing and reading a DVD. In addition, a light converging optical system composed of an objective lens 20, a wedge-shaped beam splitter or wedge-shaped prism 21, and a parallel plate beam splitter 22 are located in this order from a disc surface along the normal of the disc surface (recording surface) on which writing and reading are performed. The objective lens 20 rightly faces the disc recording surface, while the main surfaces of the wedge-shaped beam splitter 21 and the parallel plate beam splitter 22 are both inclined with respect to the normal. The laser diodes 11, 12 for DVD and CD and the wedge-shaped and parallel plate beam splitters 21, 22 are positioned such that light emitted from the laser diode 11 is incident to the surface of the wedge-shaped beam splitter 21 proximal to the disc at a predetermined angle, and the incident light is reflected on the beam splitter 21 and guided through the objective lens 20 to the recording surface of the disc, and such that light emitted from the laser diode 12 is incident to the surface of the parallel plate beam splitter 22 proximal to the disc at a predetermined angle, and the incident light is reflected on the beam splitter 22 and guided to the recording surface of the disc through the wedge-shaped beam splitter 21 and the objective lens 20.

A light beam converged by the objective lens 20 is reflected back on the recording surface of the disc, while receiving an optical modulation thereon, and reaches the objective lens 20 as return light. The return light passing through the objective lens 20 is again guided to the wedge-shaped beam splitter 21 along an optical path similar to that of the incident light to the disc. The wedge-shaped beam splitter 21 transmits the return light at this time to guide the return light to the parallel plate beam splitter 22. The parallel plate beam splitter 22 also transmits the return light from the wedge-shaped beam splitter 21 and guides the same to a light receiving element or an opto-electric transducer element 30.

It should be noted herein that a main feature of the present invention lies in that aberration-free transmitted light is produced by the wedge-shaped beam splitter 21, while transmitted light susceptible to astigmatism is produced by the parallel plate beam splitter 22. More specifically explaining, the wedge-shaped beam splitter 21 has its shape defined to transmit converged light without causing aberration, and the parallel plate beam splitter 22 capable of essentially transmitting converged light while producing astigmatism therefor is employed as a means for providing return light with an astigmatism difference for detecting a focus error of a light spot with respect to a recording surface of a disc.

A light beam emitted from the first laser diode 11 is reflected on the wedge-shaped beam splitter 21 and guided to the objective lens 20 and the recording surface of the disc without aberration, and its return light from the disc can also transmit the parallel plate beam splitter 22 without substantially producing any aberration by the wedge-shaped beam splitter 21. Then, the return light incident to the parallel plate beam splitter 22 is first provided here with an astigmatism difference for detecting a focus error. In this way, the light receiving element 30 receives the return light in a state corresponding to the amount of aberration and can therefore obtain a light receiving output for detecting a focus error.

A light beam emitted from the second laser diode 12 behaves in a similar manner. This light beam is reflected on the parallel plate beam splitter 22 and is incident to the wedge-shaped beam splitter 21 without aberration, and the incident light also transmits the wedge-shaped beam splitter 21 without aberration. Thus, the light beam from the second laser diode 12 is also guided through the objective lens 20 to the recording surface of the disc without aberration. Then, its return light from the disc can also transmit the parallel plate beam splitter 22 without substantially producing any aberration by the wedge-shaped beam splitter 22, so that the return light can be incident to the light receiving element 30 with an astigmatism difference provided by the parallel plate beam splitter 22.

Next, detailed explanation will be given of the wedge-shaped beam splitter 21 which, as described above, transmits return light from a disc to the parallel plate prism 22 without aberration and transmits a light beam from the second laser diode 12 to the objective lens 20 without aberration.

Figure 4:
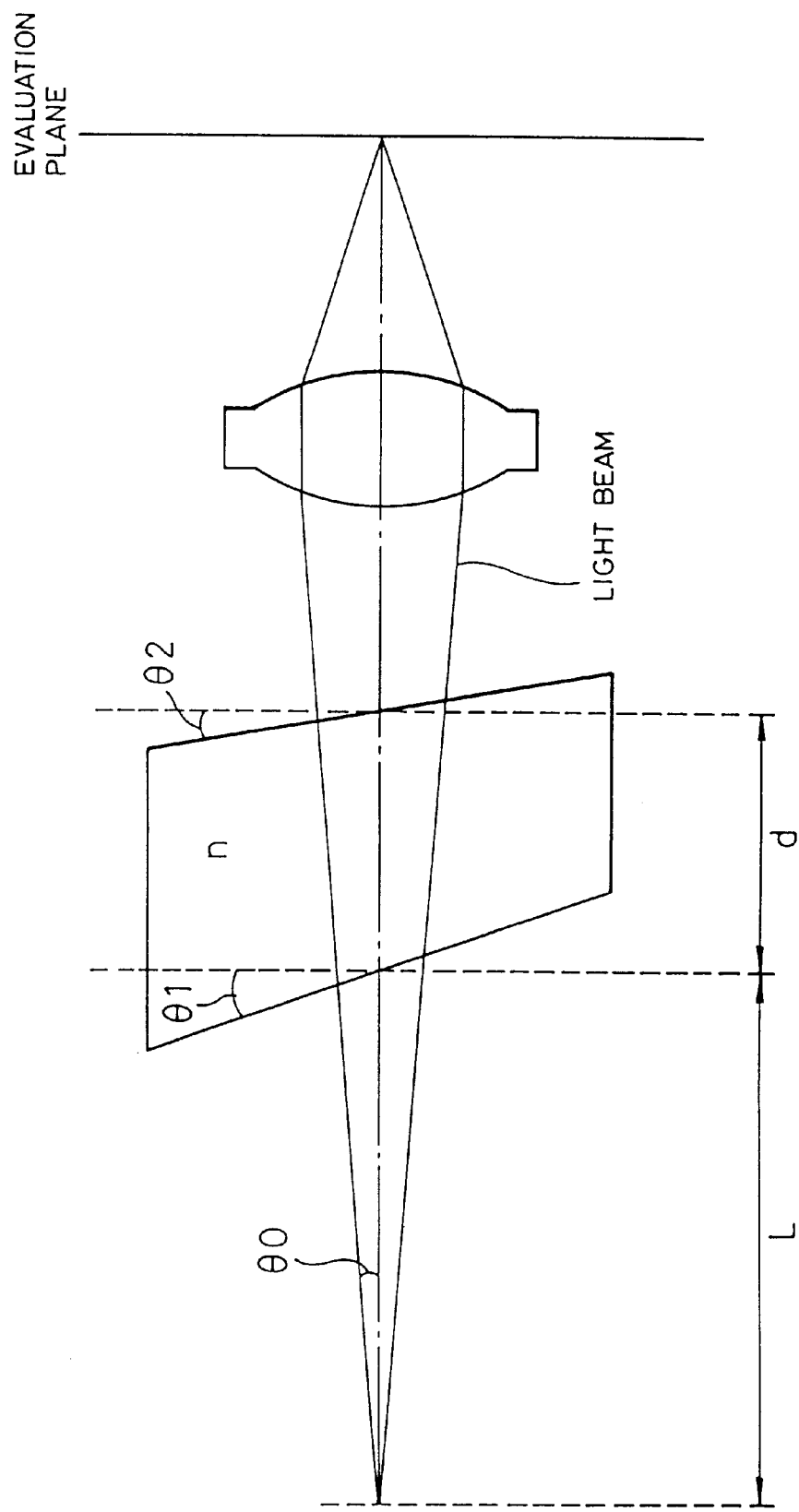
FIG. 4 is a schematic diagram illustrating parameters for defining the shape of a wedge-shaped beam splitter applied to the optical head device of FIG. 3.

FIG. 4 illustrates parameters for defining the shape and optical characteristics of the wedge-shaped beam splitter 21, as described above, together with a model of such a shape. The wedge-shaped beam splitter 21 is basically defined by a refractive index n, a thickness d, an inclination angle $\theta 1$ of the surface proximal to a light source with respect to a plane orthogonal to the light axis, an inclination angle θ2 of the surface proximal to an objective lens with respect to a plane orthogonal to the light axis, an angle θ0 at which a light beam is emitted from the light source, and a distance L from the light source to the surface position on the light axis at which the light beam is incident.

Figure 5:
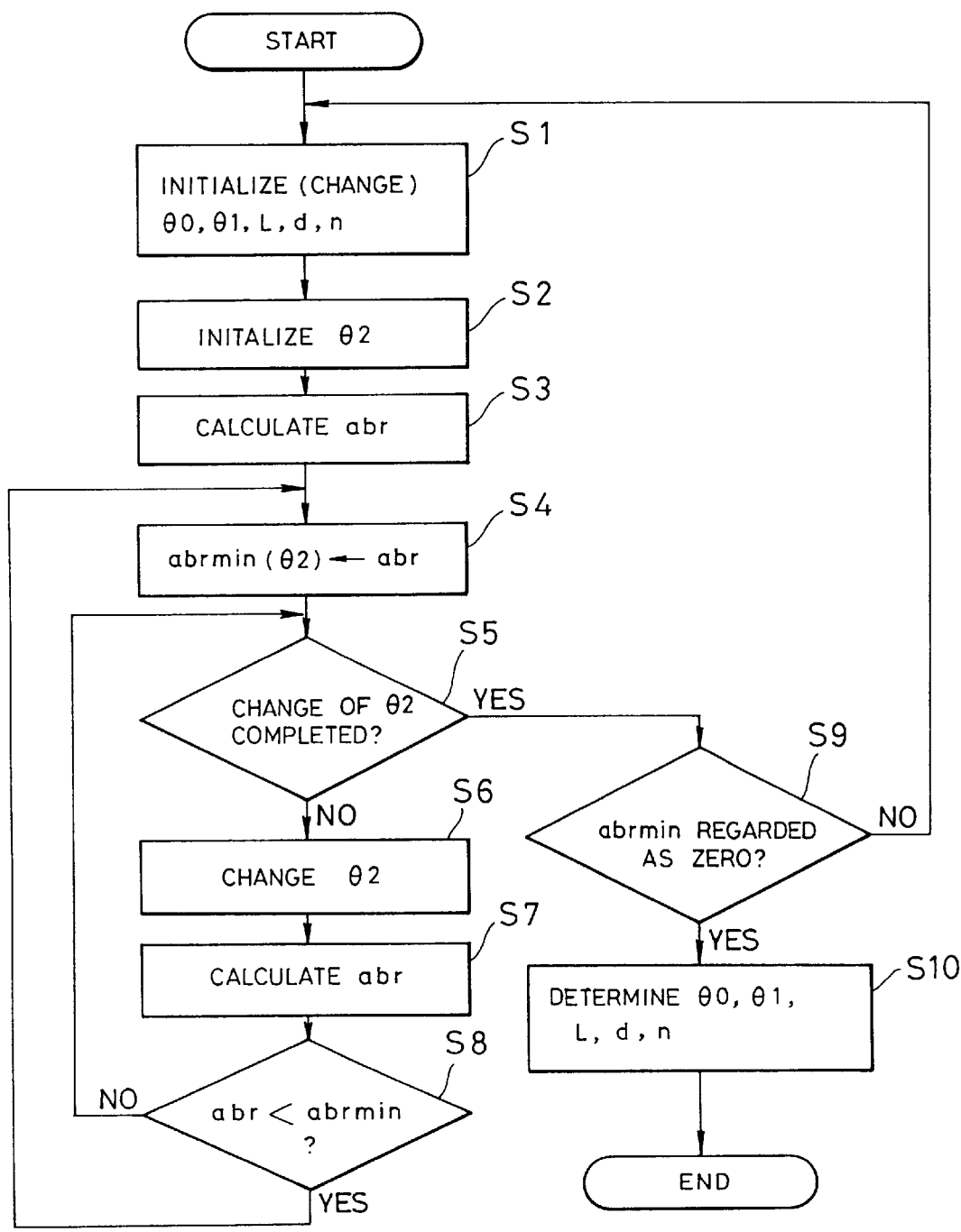
FIG. 5 is a flow chart representing an approach for determining the shape of a wedge-shaped beam splitter for providing aberration-free transmitted light based on the parameters shown in FIG. 4.

FIG. 5 illustrates a flow chart representing an approach for determining the shape of the wedge-shaped beam splitter based on the parameters mentioned above.

First, initial values are set for θ0, θ1, n, d, L among the foregoing parameters (step S1), and an initial value is also set for θ2 (step S2). These initial values are based on an optical system actually employed for an optical pickup. The initial value of θ2 may be set to the same value as that of θ1. This is because subsequent changes in parameters can be readily assumed when based on a wedge-shaped beam splitter of a parallel plate.

Next, an aberration amount abr of a light beam is calculated on an evaluation plane (see FIG. 4) defined on the basis of the values set to the parameters (step S3), and the calculated abr is once held corresponding to the value of θ2 at that time as the value of abrmin (step S4). Subsequent to step S4, it is determined whether or not a change of the value of θ2 is terminated (step S5). This step determines whether or not the value of θ2 has been changed over the entirety of a previously defined range (for example, in a range of ±90° for the initial value of θ2) at the next step S6. If there still remains a margin for the change, the flow proceeds to step S6 where the value of θ2 is change by a predetermined changing width.

When the value θ2 is changed at step S6, the aberration amount abr is calculated based on the new θ2 similarly to step S3 (step S7). When the aberration amount abr is newly calculated in this way, the new aberration amount abr is compared with the value of the foregoing abrmin (step S8), and the flow proceeds to step S4 if abr<abrmin, where the calculated abr is held corresponding to θ2 at that time as abrmin, and the processing from step S5 onward is repeated. If a smaller value of abr than the value of abrmin is calculated each time θ2 is changed, the processing from step S4 to step S8 is repeated, and abrmin (θ2) is updated in each repetition.

If abr≧abrmin is determined at step S8, i.e., if the newly calculated value of abr is higher than the held value of abr, abrmin is not updated, and the flow proceeds to step S5, where abr is evaluated for θ2 which is to be next changed.

If it is determined at step S5 that the change of 2 has been fully completed, it is determined whether or not the finally calculated value of abrmin can be regarded to be zero, i.e., to exhibit no aberration (stated another way, the value of abrmin can be ignored) (step S9). If so, the value of θ2 corresponding to this abrmin and the currently set values of θ0, θ1, n, d, and L are determined as the parameters for the shape and optical characteristics of the wedge-shaped beam splitter (step S10), followed by the termination of the processing.

On the other hand, if it is determined at step S9 that the value of abrmin cannot be regarded as zero, the flow proceeds to step S1, where the value of at least one of θ0 θ1, n, d, and L is changed, and the processing from step S2 onward is again executed. At step S1 executed in such a flow, the priority can be given to the parameters subjected to the change of value. For example, the values of θ1, d, n, which are parameters of the wedge-shaped prism or wedge-shaped beam splitter 21 itself may be preferentially changed, such that the values of θ0 and L are changed only after it is determined at step S6 that an optimal value cannot be still provided for abrmin even if the values of these parameters θ1, d, n are changed.

Thus, the specifications for the wedge-shaped beam splitter which transmits incident light without aberration can be determined by the approach as illustrated in FIG. 5.

Next, an optical head device constructed based on the foregoing basic principles according to one embodiment of the present invention will be described with reference to FIG. 6.

Figure 6:
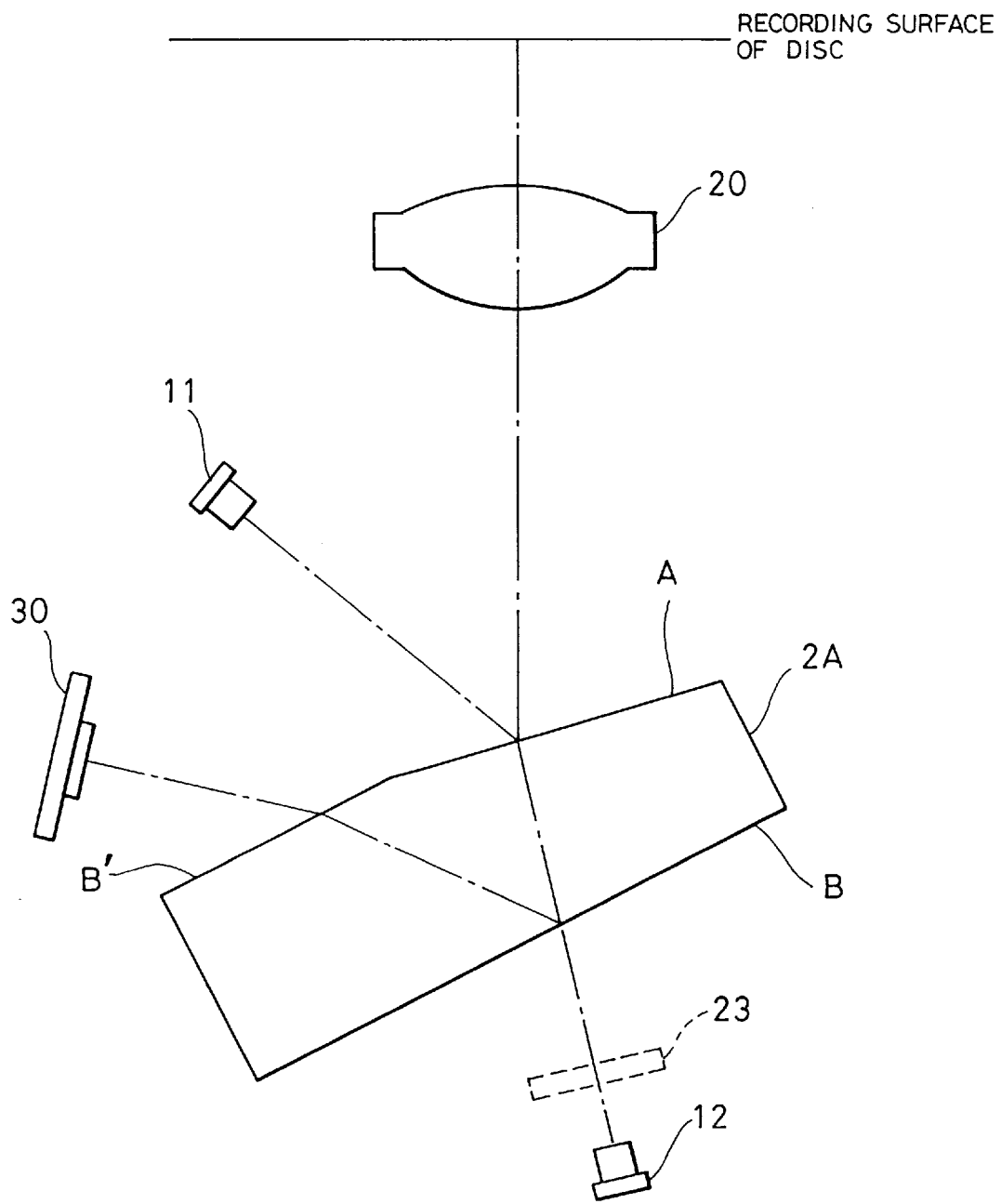
FIG. 6 is a schematic diagram illustrating a general structure of an optical head device according to one embodiment of the present invention.

The optical head device of FIG. 6 employs a structure in which the optical functions of the aforementioned beam splitter 21 and the parallel plate beam splitter 22 are implemented by a single modified wedge-shaped prism 2A. The modified wedge-shaped prism 2A has a surface A facing an objective lens 20, a non-parallel surface B opposite to the surface A, and a surface B' parallel to the surface B and facing the objective lens 20. Further, the surfaces A and B' form an angle such that these surfaces appear to be a ridge shape or a protrusion.

Laser diodes 11, 12 for DVD and CD and the modified wedge-shaped beam splitter 2A are positioned such that light emitted from the laser diode 11 is incident to the surface A of the wedge-shaped prism 2A (first incident surface) at a predetermined angle, and this incident angle is reflected on the prism 2A and guided to a recording surface of a disc through the objective lens 20, while light emitted from the laser diode 12 is incident to the surface B of the wedge-shaped prism 2A (second incident surface) at a predetermined angle, and this incident light transmits the prism 2A and is guided to the recording surface of the disc through the objective lens 20. Further, the structure including a light receiving element 30 is defined such that return light from the recording surface of the disc is incident to the wedge-shaped prism 2A through the objective lens 20 along a similar optical path to that of the incident light from the laser diode 11 in the reverse direction, guided to the surface B along an optical path similar to that of the incident light from the laser diode 12 in the reverse direction in the prism 2A, reflected on the surface B to redirect to the surface B' (output surface), and guided to the light receiving element or opto-electric transducer element 30 after transmitting the surface B'.

This embodiment features that the modified wedge-shaped prism 2A exhibits an aberration-free characteristic for incident light to the disc (light beam on the going path) and can produce astigmatism for return light from the disc (light beam on the return path). This structure may be more easily understood when considered in comparison with the aforementioned structure illustrated in FIG. 3. Specifically, this embodiment is identical to the structure of FIG. 3 in that light emitted from the first laser diode 11 is reflected on the wedge-shaped prism 2A and guided to the objective lens 20 and the recording surface of the disc without aberration. Also, return light from the disc, by the light emitted from the laser diode 11, passes through the surfaces A and B of the wedge-shaped prism 2A. Since the relationship between the surface A and B just corresponds to the surfaces A and B of the wedge-shaped beam splitter 21 in FIG. 3, the return light directs to the surface B' without substantially producing aberration. Further, the surfaces B and B' have a relationship just like the relationship between the surfaces C and D of the parallel plate beam splitter 22 in FIG. 3. Thus, the return light can be first provided with an astigmatism difference for detecting a focus error between the surfaces B and B'. This allows the light receiving element 30 to receive the return light in a state corresponding to an aberration amount and accordingly to obtain a light receiving output for detecting a focus error.

Figure 2:
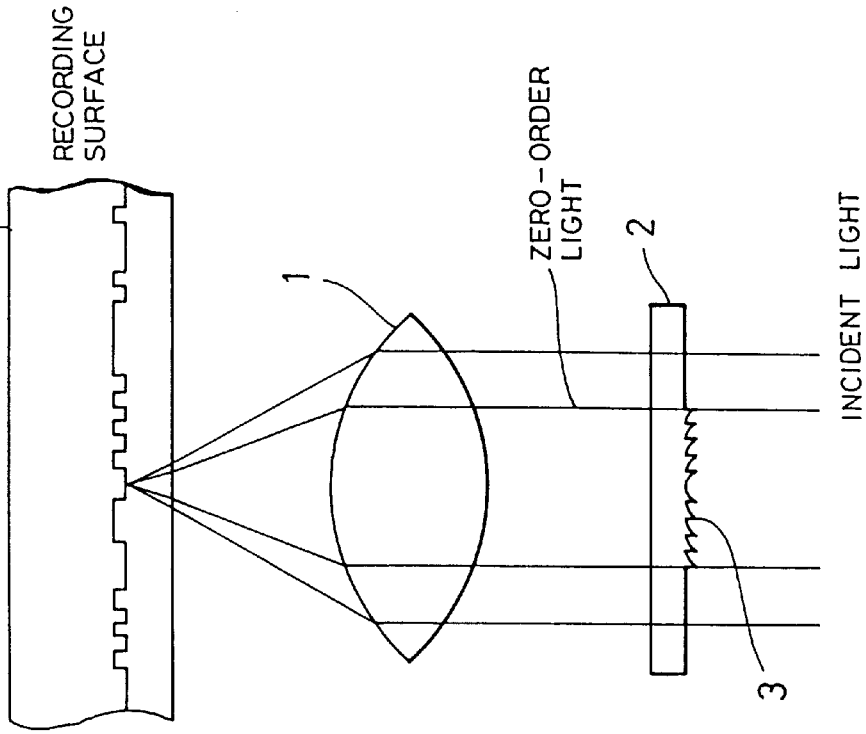
FIGS. 1 and 2 are schematic diagrams each illustrating a portion of a structure of a prior art optical pickup device employing a single light source/two-focus lens system.
Figure 1:
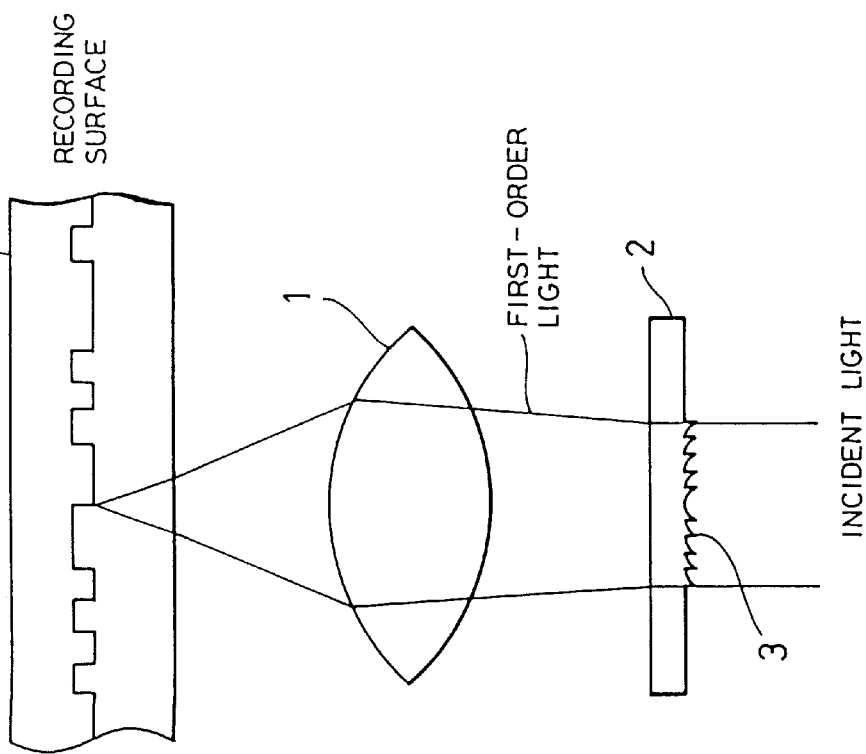

The above discussion is also applied to a light beam emitted from the second laser diode 12. The light beam first transmits the modified wedge-shaped prism 2A from the surface B to the surface A. In this event, an optical action can be regarded as identical to the action of light transmitting from the surface B to the surface A of the wedge-shaped beam splitter 21 in FIG. 3, so that the incident light can be guided to the objective lens 20 and the recording surface of the disc without aberration. Further, its return light transmits the modified wedge-shaped prism 2A from the surface A to the surface B, exhibits substantially no aberration, similarly to the corresponding return light transmitting the wedge-shaped beam splitter 21 from the surface A to the surface B in FIG. 3. In the process of transmittance of the modified wedge-shaped prism 2A from the surface B to the surface B', the return light can be first provided with an astigmatic difference similarly to the process of transmittance of the parallel plate beam splitter 22 from the surface C to the surface D in FIG. 2.

Since this embodiment includes a light source for CD and CD-R in addition to that for DVD, it is possible to provide an optical head device capable of properly writing and reading a CD-R, and a CD/DVD compatible player using this optical head device. Also, in this embodiment, since a single prism having corresponding surfaces to the respective light sources is only required to provide aberration-free light and aberration included light at the respective optical path positions, the structure of the optical system can be simplified, thereby contributing to a reduction in size of the optical head or optical pickup. In addition, since the optical actions of the aforementioned two beam splitters 21, 22 are implemented only by the modified prism 2A, the structure is largely simplified even in comparison with the structure of FIG. 3.

Next, a method of fabricating the modified wedge-shaped prism 2A will be described.

Figure 7:
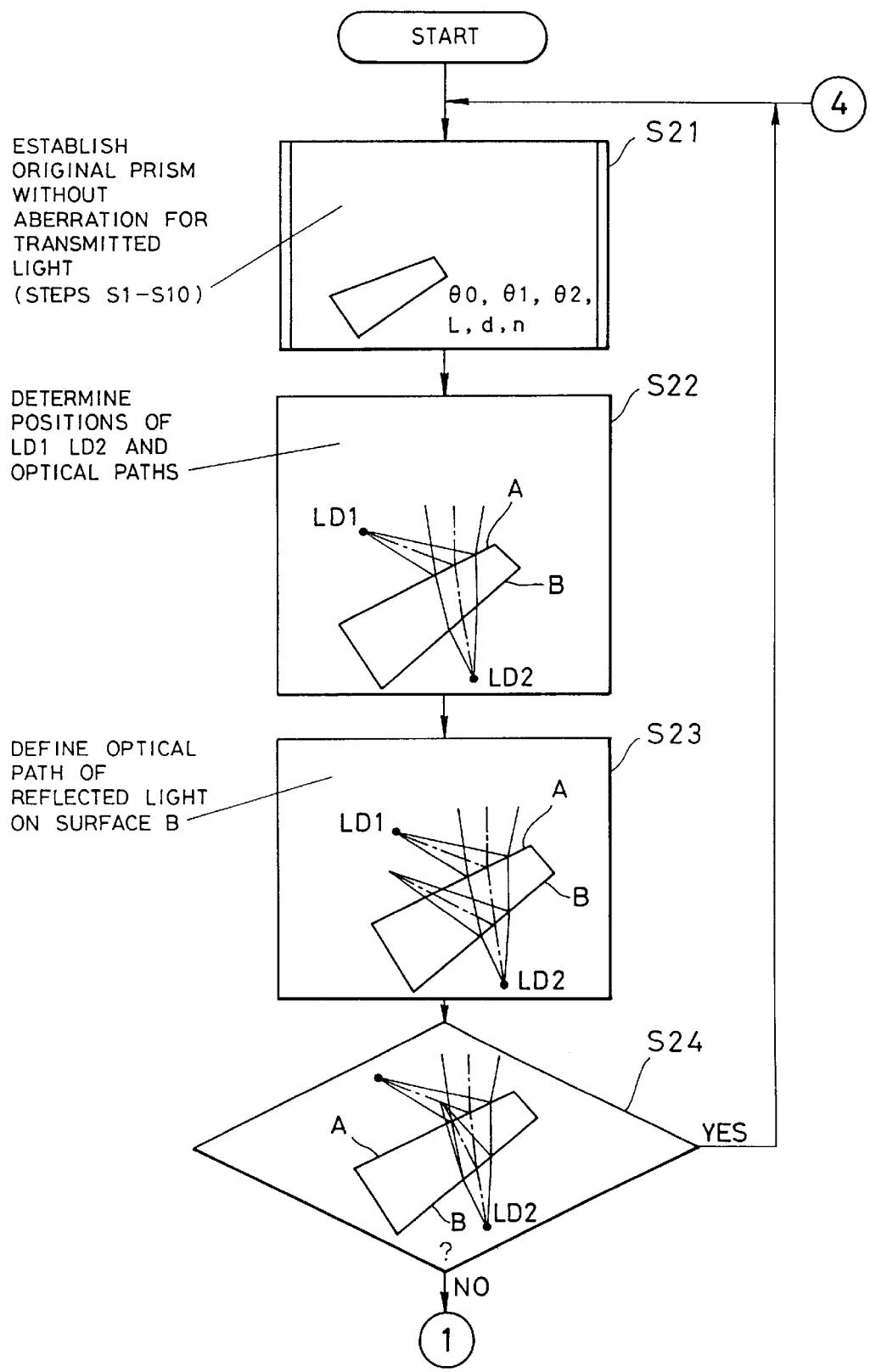
FIG. 7 is a first flow part of a flow chart illustrating a method of fabricating a modified wedge-shaped prism applied to the optical head device of FIG. 6.
Figure 8:
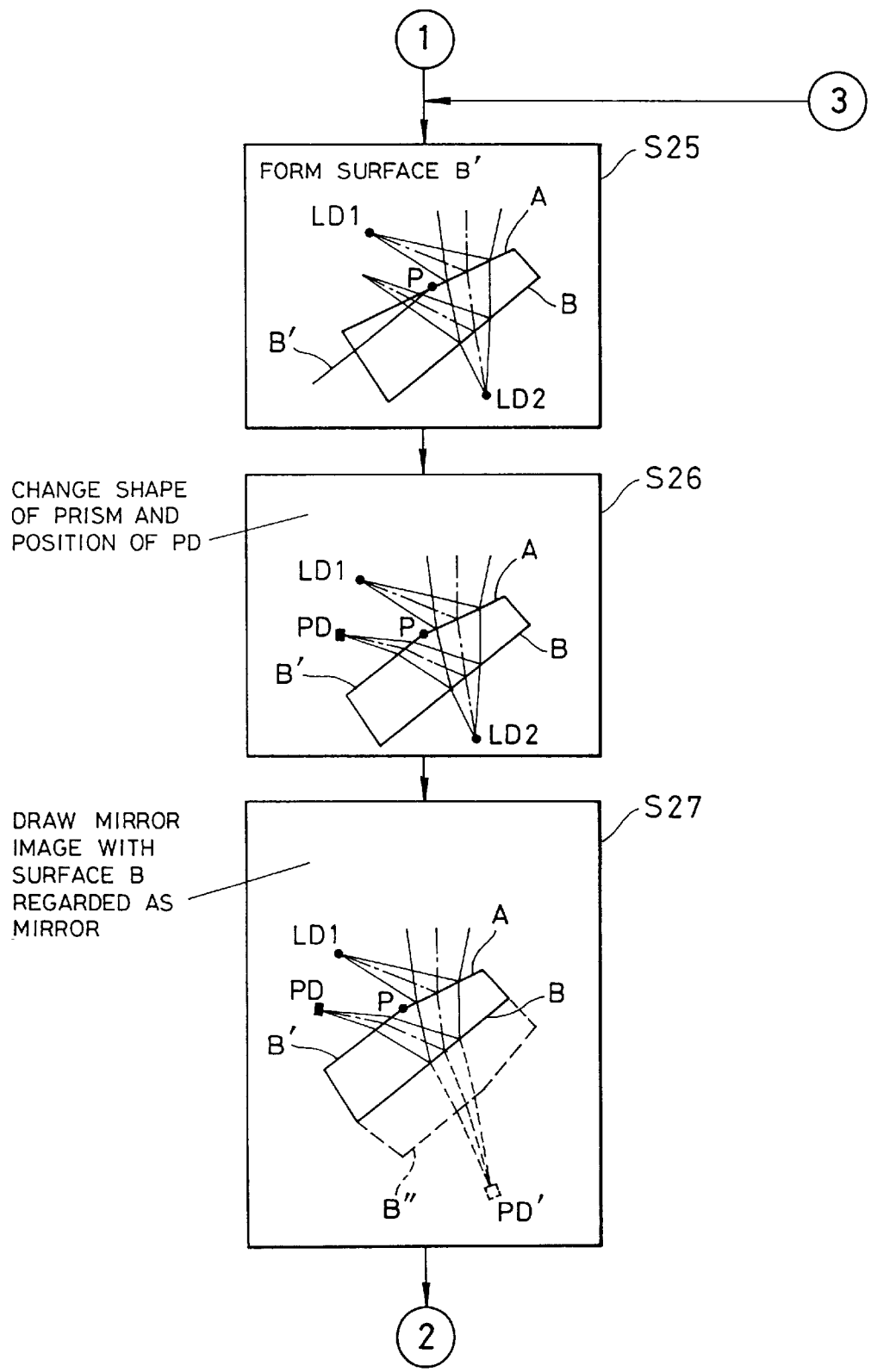
FIG. 8 is a second flow part of the flow chart illustrating the method of fabricating the modified wedge-shaped prism applied to the optical head device of FIG. 6.
Figure 9:
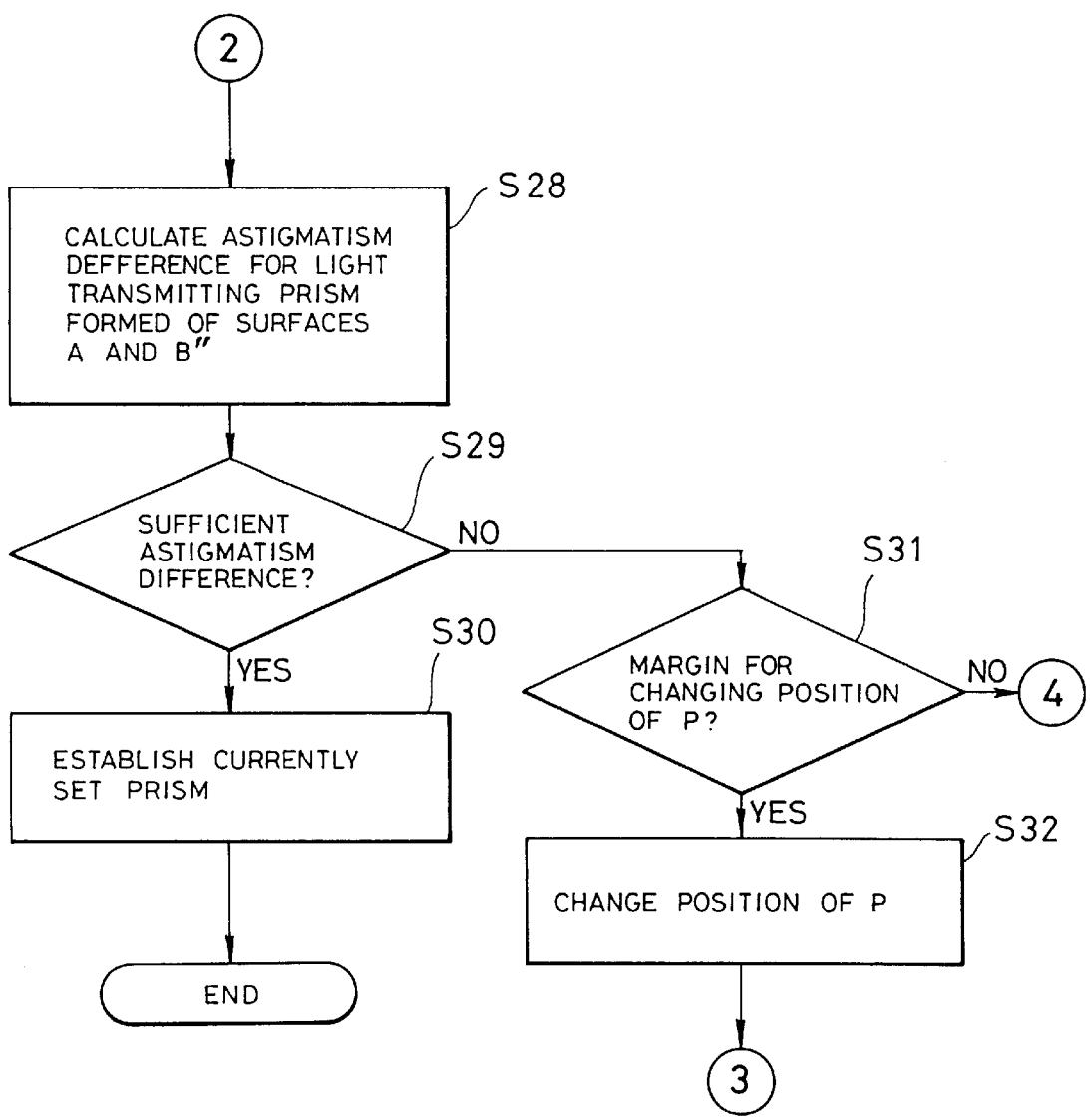
FIG. 9 is a third flow part of the flow chart illustrating the method of fabricating the modified wedge-shaped prism applied to the optical head device of FIG. 6.

FIGS. 7–9 are flowcharts illustrating the method of fabricating the modified wedge-shaped prism 2A. First, an original prism providing aberration-free transmitted light is established by the aforementioned approach as illustrated in FIGS. 4 and 5 (step S21). At this step, the parameters θ0, θ1, θ2, L, d, n as shown in the aforementioned step S10 are also established, so that the subsequent processing is executed based on the established parameters. Next, the first and second laser diodes (LD1, LD2) 11, 12 are positioned with respect to the established original prism, and resulting optical paths or light fluxes are defined (step S22). The positioning of the diodes is made such that incident light to a disc and return light from the disc by respective light emitted from the first and second laser diodes form an optical path common to them. Subsequent to the completion of the positioning, an optical path of the reflected light is defined on the surface B of the modified wedge-shaped prism 2A (step S23), and it is determined simultaneously whether or not the light emitted from the first laser light 11 and the reflected light on the surface B overlap on the resulting optical path of the return light (step S24). If both light overlap as described in step S24, the flow proceeds to step S21 to restart from the fabrication of the original prism, followed by the execution of the aforementioned steps S1–S10 after the predetermined parameters have been changed.

At step S24, if the light emitted from the first laser diode 11 and the reflected light on the surface B do not overlap on the optical path, the flow proceeds to the next step to form the surface B' parallel to the surface B on the surface A side (step S25). The surface B' is set such that an intersection P of the surface A and the surface B' is positioned between an emitted light flux of the first laser diode 11 and the reflected light flux on the surface B. When a proper setting for the surface B' is terminated, the shape of the prism is modified to have the set surface B' as an external surface. Then, a light converging point of the reflected light after transmitting the surface B' is defined in consideration of the fact that the reflected light on the surface B refracts on the surface B', and a light receiving surface of the light receiving element (PD) 30 is set at the position of the defined light converging point (step S26).

Once the positions of the first and second laser diodes 11, 12 and the light receiving element 30 have been thus defined with respect to the preliminary modified prism, mirror images of the surface B' and the light receiving element 30 as well as optical paths associated therewith are drawn, with the surface B regarded as a mirror, for confirming whether or not this prism can provide a predetermined astigmatism difference (step S27). Then, an astigmatism difference of light transmitting a virtual prism formed of the resulting mirror image surface B'' of the surface B' and the surface A is calculated at a mirror image of a light receiving element PD' (step S28). Specifically, calculated herein is the degree of astigmatism difference on the light receiving surface of the light receiving element PD' given during a time period in which return light by light emitted from the first laser diode (LD1) 11 transmits from the surface A to the surface B and exits the surface B''. To calculate such an astigmatism difference, for example, a sigmoidal curve exhibited by a focus error signal produced on the basis of the output of the light receiving element may be calculated by way of experiment to derive the magnitude of the S-shaped curve (a peak-to-peak value or a value equivalent thereto).

The astigmatism difference calculated at step S28 is evaluated at the next step S29 to determine whether or not it is sufficient for a focus servo, or whether or not the sigmoidal curve calculated by way of experiment exhibits a level required for the focus servo. If it is determined at step S29 that the astigmatism difference is sufficient, the shape of the modified prism is established with the presently set prism parameters and the surfaces A, B, B' defined under the aforementioned design conditions, followed by the termination of the processing.

If it is determined at step S29 that sufficient astigmatism difference cannot be produced, it is determined whether or not there is any point at which the point P has not been placed within a range in which the point P may be changed, i.e., whether or not there is still a margin for changing the point P (step S31). If there is a margin, the position of the point P is changed (step S32), followed by the flow proceeding to step S25, from which the processing from step S26 onward is again executed. On the other hand, if it is determined at step S31 that there is no margin of change, the flow proceeds to step S21, where the values of predetermined parameters are changed, and the processing is restarted from the fabrication of an original prism.

Finally, the modified wedge-shaped prism 2A having a shape optimal to the structure of FIG. 6 can be provided.

The optical characteristics of the main surfaces A, B' of the modified wedge-shaped beam splitter 2A proximal to the objective lens and the opposite main surface B of the same may be optimized in the following manner. Such optimization is basically intended such that return light by the first and second laser beams from a disc exhibits a maximum intensity on the light receiving element 30.

First, assume as premises of the calculation that the light reflectivity of the surfaces A and B' is RA (therefore, a light transmissivity is 1−RA), the light reflectivity of the surface B is RB (thus, the light transmissivity is 1−RB), and the light intensity does not suffer from any loss on a disc.

Since a beam emitted from the DVD laser diode 11 traces a path: LD1→the surface A (reflection)→the recording surface of the disc (reflection)→the surface A (transmittance)→the surface B (reflection)→the surface B' (transmittance)→the light receiving element 30, a light intensity I1 on the light receiving element 30 is expressed by:

$$I1 = RA \times (1-RA) \times RB \times (1-RA) \quad (1)$$

On the other hand, since a beam emitted from the CD laser diode 12 traces a path: LD2→the surface B (transmittance)→the surface A (transmittance)→the recording surface of the disc (reflection)→the surface A (transmittance)→the surface B (reflection)→the surface B' (transmittance)→the light receiving element 30, a light intensity I2 on the light receiving element 30 is expressed by:

$$I2 = (1-RB) \times (1-RA) \times (1-RA) \times RB \times (1-RA) \quad (2)$$

Figure 10:
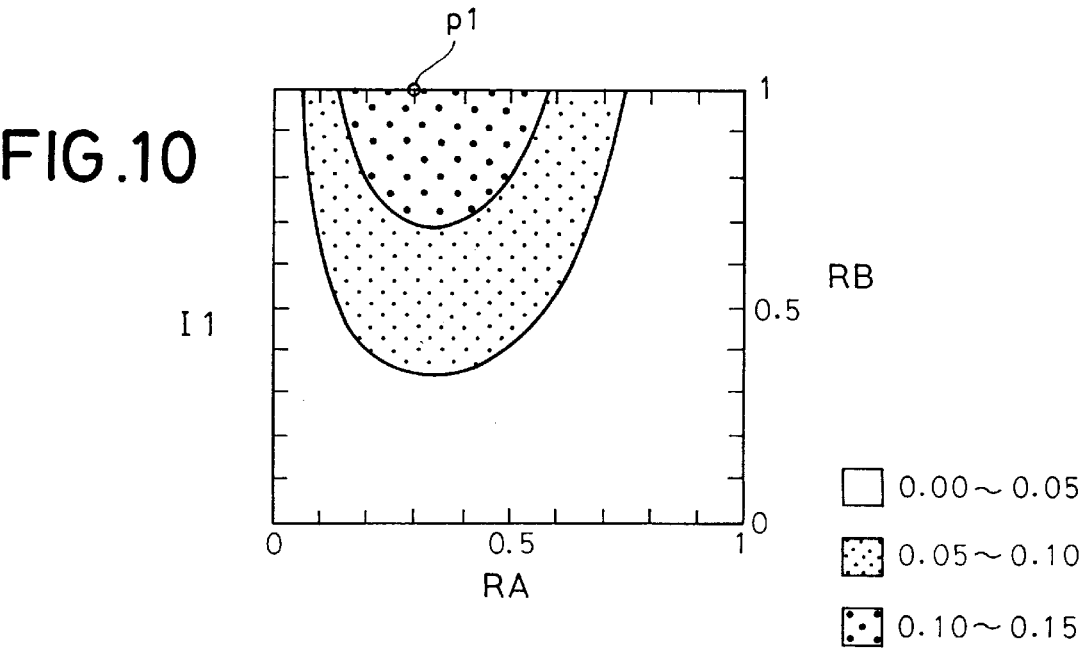
FIGS. 10 and 11 are graph respectively illustrating a light intensity distribution on a light receiving element for explaining how the optical characteristics are selected for surfaces of the modified wedge-shaped prism in FIG. 6.
Figure 11:
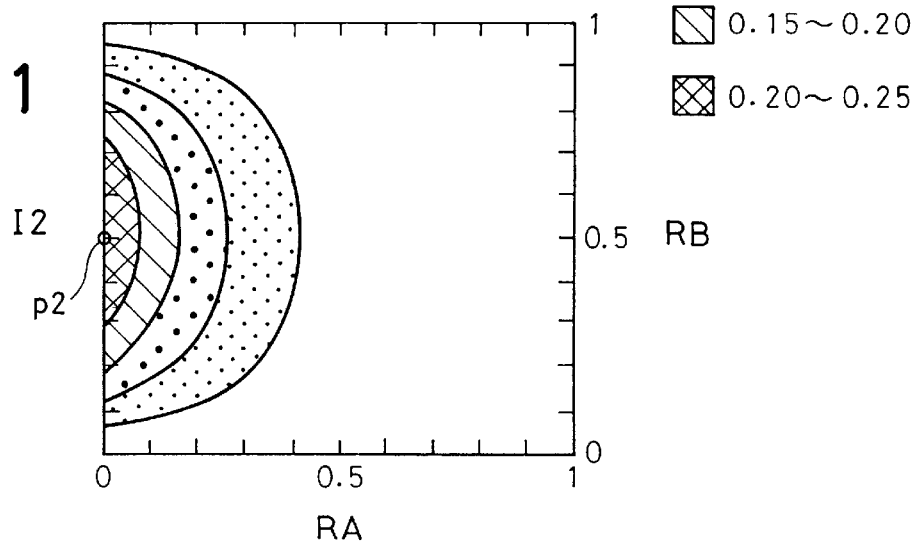

FIGS. 10–12 are graphs created on the basis of the above equations (1) and (2). Specifically, FIG. 10 shows an intensity distribution of the received light intensity I1 with respect to an emitted light intensity at one with the abscissa representing the reflectivity RA and the ordinate representing the reflectivity RB. It can be seen from the graph of FIG. 10 that I1 substantially reaches a maximum at an estimated optimal point p1, i.e., when RA=0.3 and RB=1.0. Likewise, FIG. 11 shows an intensity distribution of the received light intensity I2 with respect to an emitted light intensity at one with the abscissa representing the reflectivity RA and the ordinate representing the reflectivity RB. It can be seen from the graph of FIG. 11 that I2 substantially reaches a maximum at an estimated optimal point p2, i.e., when RA=0 and RB=0.5.

It will be understood from the distributions of I1 and I2 that the optical characteristics of the surfaces A and B' should be defined such that the beam emitted from the DVD laser diode 11 exhibits a reflectivity of 0.3 and the beam emitted from the CD laser diode 12 fully transmits, while the optical characteristics of the surface B should be defined such that the beam emitted from the DVD laser diode 11 is fully reflected and the beam emitted from the CD laser diode 12 exhibits a reflectivity of 0.5, in order for the return light from the disc to exhibit a maximum intensity on the light receiving element 30. FIG. 12 shows a table which lists the results of the foregoing calculations. Such light reflection (transmittance) characteristics of the surfaces A, B', and B may be realized by the formation of multiple optical thin films.

Figure 13:
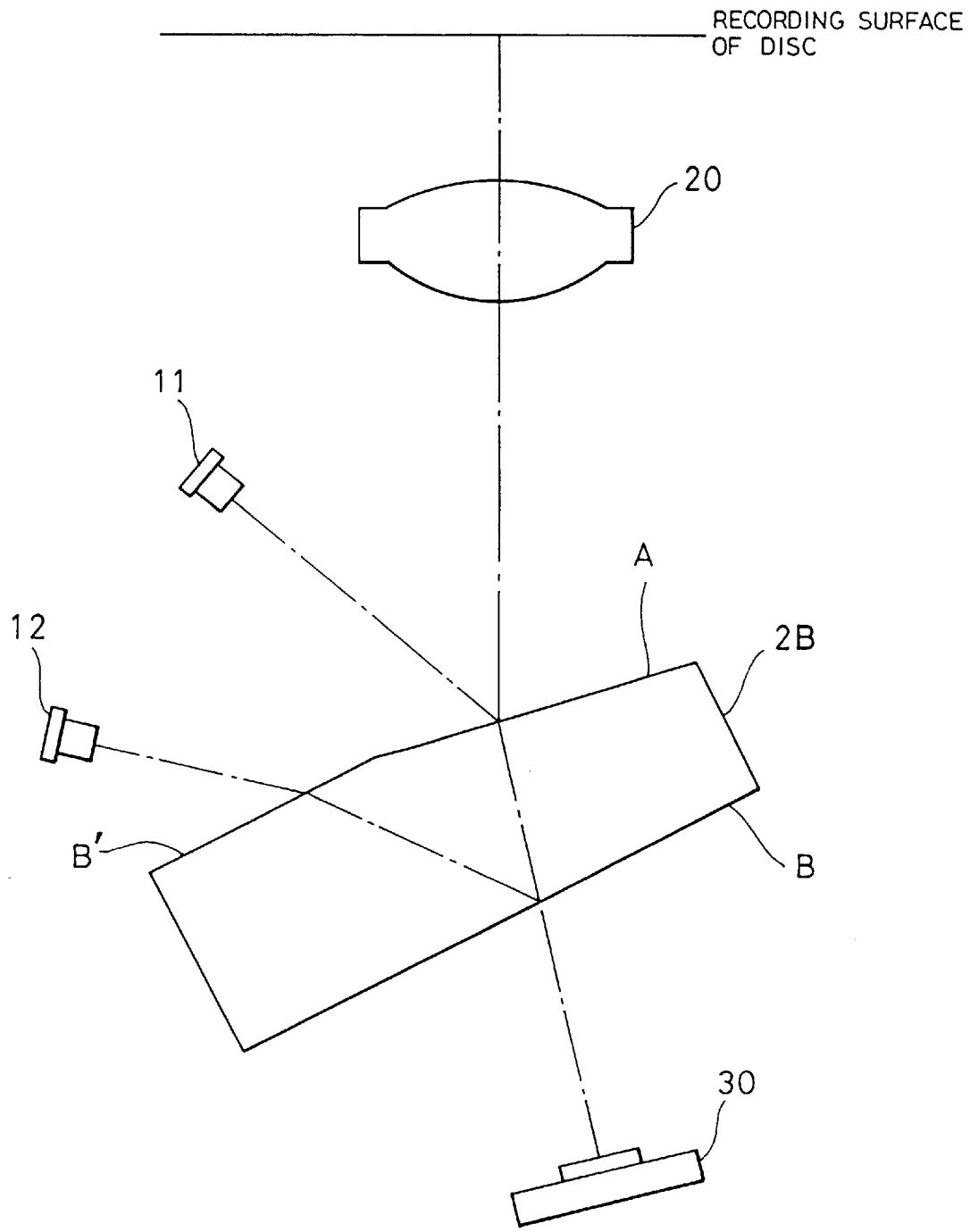
FIG. 13 is a schematic diagram illustrating a general structure of an optical head device according to another embodiment of the present invention.

As another embodiment of the present invention, a structure illustrated in FIG. 13 may be assumed.

Referring specifically to FIG. 13, unlike the structure of FIG. 6, an optical pickup employs a structure in which a second laser diode 12 is positioned on the objective lens side of a varied modified wedge-shaped prism 2B, and a light receiving element 30 is positioned on the opposite side.

Explaining in greater detail, while the structure of FIG. 13 is similar to the structure of FIG. 6 in that the modified wedge-shaped prism 2B is also characterized by making incident light to a disc (light beam on the going path) aberration-free while being capable of producing an astigmatism difference for return light (light beam on the return path), light emitted from the first laser diode 11 is reflected on the surface A (first input surface) of the wedge-shaped prism 2B and guided to the objective lens 20 and the recording surface of the disc without aberration, while its return light transmits the surface A and the surface B (output surface) of the wedge-shaped prism 2B and is incident to the light receiving element 30. While the return light transmits the optically transparent wedge-shaped body because of the surfaces A and B which are not in parallel with each other, in this embodiment, each of the aforementioned parameters is set to cause the optically transparent wedge-shaped body to produce an astigmatism difference, so that the return light is first provided with the astigmatism difference for detecting a focus error between these surfaces. This enables the light receiving element 30 to receive the return light in a state corresponding to the amount of such aberration and therefore obtain a light receiving output for detecting the focus error.

On the other hand, a light beam emitted from the second laser diode 12 transmits the surface B' (second input surface) substantially parallel (not necessarily parallel) to the surface B of the wedge-shaped prism 2B, is reflected on the surface B. further transmits the surface A, and is guided to the objective lens 20. In this event, the wedge-shaped prism 2B is established with parameters which have been set such that substantially no aberration is produced on an optical path from the surface B' to the surface A, so that the emitted light beam is irradiated to the recording surface of the disc through the objective lens 20 without aberration. In other words, the action of the wedge-shaped prism 2B on the optical path from the surface B' to the surface A is made equivalent to the action of the aforementioned wedge-shaped prism 21 in FIG. 2. Return light from the disc by the light emitted from the second laser diode 12 is first provided with an astigmatism difference on an optical path from the surface A to the surface B, as is the case of the light emitted from the first laser diode 11.

In summary, the modified wedge-shaped prism 2B is established with each of the aforementioned parameters including the surface forming conditions such that the modified wedge-shaped prism 2B produces a necessary astigmatism difference on the optical path along which light transmits from the surface A to the surface B, but does not cause any aberration on the optical path along which light incident to the surface B is reflected on the surface B' and reaches the surface A. The prism 2B is also fabricated, similarly to the concept of the foregoing FIGS. 7–9, such that correct optical paths can be ensured and a sufficient astigmatism aberration can be provided at a desired position on an optical path. However, the fabrication of the prism 2B involves an additional requirement to be considered that a predetermined optical path (the optical path along which light transmits from the surface B' to the surface A by way of the surface B) is free of aberration.

Likewise, the optical characteristics of the main surfaces A, B' proximal to the objective lens and the main surface B on the opposite side of the modified wedge-shaped beam splitter 2B are also optimized such that return light from a disc by the first and second laser beams exhibits a maximum intensity on the light receiving element 30. In calculations for the optimization, assume as promises similar to those in FIG. 5 that the light reflectivity of the surfaces A and B' is RA, the light reflectivity of the surface B is RB, and the light intensity does not suffer from any loss on a disc. Since a beam emitted from the DVD laser diode 11 traces a path:

LD1→the surface A (reflection)→the recording surface of the disc (reflection)→the surface A (transmittance)→the surface B (transmittance)→the light receiving element 30, a light intensity I1 on the light receiving element 30 is expressed by:

$$I1 = RA \times (1-RA) \times (1-RB) \quad (3)$$

On the other hand, since a beam emitted from the CD laser diode 12 traces a path: LD2→the surface B' (transmittance) →the surface B (reflection)→the surface A (transmittance) →the recording surface of the disc (reflection)→the surface A (transmittance)→the surface B (transmittance)→the light receiving element 30, a light intensity I2 on the light receiving element 30 is expressed by:

$$I2 = (1-RA) \times RB \times (1-RA) \times (1-RA) \times (1-RB) \quad (4)$$

FIGS. 14–16 are graphs created on the basis of the above equations (3) and (4). Likewise, in FIGS. 14–16, as can be understood from similar consideration to that made to the foregoing FIGS. 10–12, I1 substantially reaches a maximum at an estimated optimal point p1, i.e., when RA=0.5 and RB=1.0, and I2 substantially reaches a maximum at an estimated optimal point p2, i.e., when RA=0 and RB=0.5.

It can be understood from the foregoing that the optical characteristics of the surfaces A and B' of the wedge-shaped prism 2B should be defined such that a beam emitted from the DVD laser diode 11 exhibits a reflectivity of 0.5, and a beam emitted from the CD laser diode 12 fully transmits, while the optical characteristics of the surface B of the wedge-shaped prism 2B should be defined such that the beam emitted from the DVD laser diode 11 fully transmits, and the beam emitted from the CD laser diode 12 exhibits a reflectivity of 0.5, in order for return light from a disc to exhibit a maximum intensity on the light receiving element 30. The results are shown in FIG. 16.

Figure 17:
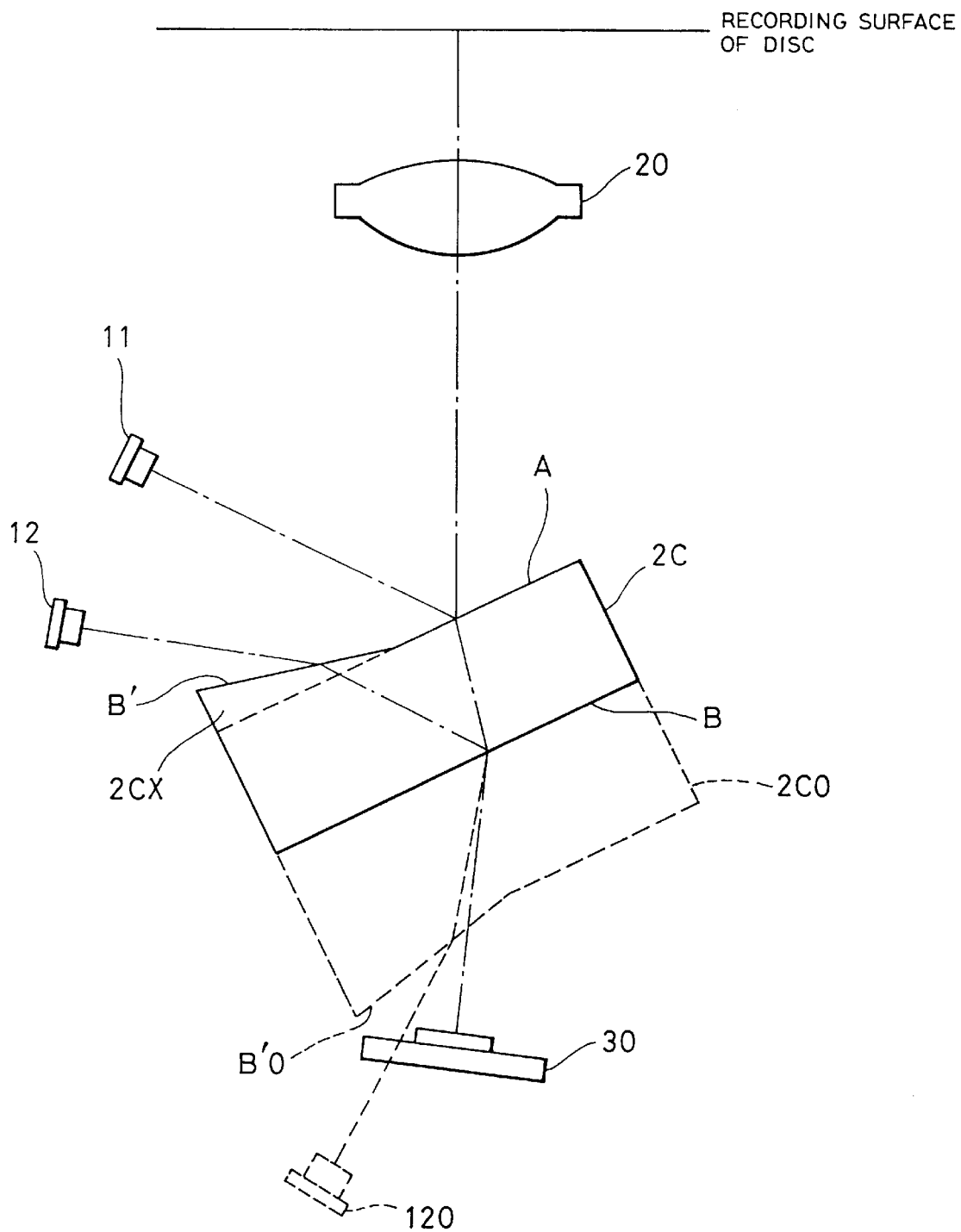
FIG. 17 is a schematic diagram illustrating a general structure of an optical head device according to a further embodiment of the present invention.

FIG. 17 illustrates the structure of an optical head device according to a further embodiment of the present invention.

It can be said that a modified wedge-shaped prism 2C in FIG. 17 has a limited shape in comparison with the structure of FIG. 13. Specifically, in the varied modified wedge-shaped prism 2C, a first input surface A to which light emitted from a first laser diode 11 is incident and an output surface B for guiding return light from a disc to a light receiving element 30 are in a substantially parallel relationship, and a second input surface B' to which light emitted from a second laser diode 12 is incident has a flat plane with one end side thereof being inclined from a plane parallel to the output surface B toward an objective lens 20 at a predetermined angle. In other words, the surfaces A and B' form a valley shape or a recess.

The optical action of this prism may be simply explained by drawing a mirror image produced when the surface B is regarded as a mirror. Such a mirror image, as illustrated by broken lines in FIG. 17, virtually includes a mirror image 2C0 of the wedge-shaped prism 2C, symmetric to the surface B, and a mirror image 120 of the second laser diode 12, and a mirror image B' 0 of the surface B', wherein light emitted from the second laser diode 120 is regarded as tracing an optical path which enters the surface B' 0, passes through the surface B and exits the surface A.

It can be seen in this structure that the surfaces B' 0 and A can be thought to form an optically transparent wedge-shaped body for light emitted from the second laser diode 12, so that they serve as the wedge-shaped beam splitter 21 in the foregoing FIG. 3 to guide the emitted light to a recording surface of a disc without aberration. On the other hand, return light from a disc, by the light emitted from the laser diode 12, transmits the surfaces A and B and is incident to the light receiving element 30. In this event, the surfaces A and B can be thought to form an optically transparent parallel plate. It can be seen that the surfaces A and B act in a manner similar to the parallel plate beam splitter 22 in the foregoing FIG. 2, i.e., provide an astigmatism difference to the return light and guide the return light to the light receiving element 30.

Light emitted from the first laser diode 11 can be more readily explained without assuming a mirror image. The light emitted from the first laser diode 11, when incident to a recording surface of a disc, is reflected only by the surface A, so that it has no aberration. On the other hand, its return light is guided to the light receiving element 30 through an optically transparent parallel plate portion formed by the surfaces A and B, so that an astigmatism difference can be provided thereto as is the case of the return light by the light emitted from the laser diode 12.

The modified wedge-shaped prism 2C is also formed with a concept similar to the aforementioned fabricating method based on the parameters and the approach for setting the optical characteristics of the respective surfaces. Specifically, the prism 2C is fabricated by first providing an original optically transparent parallel plate having a surface A, its extending surface, and a surface B, and bonding a portion 2CX protruding from the surface A for forming the surface B' to the original parallel plate.

Figure 18:
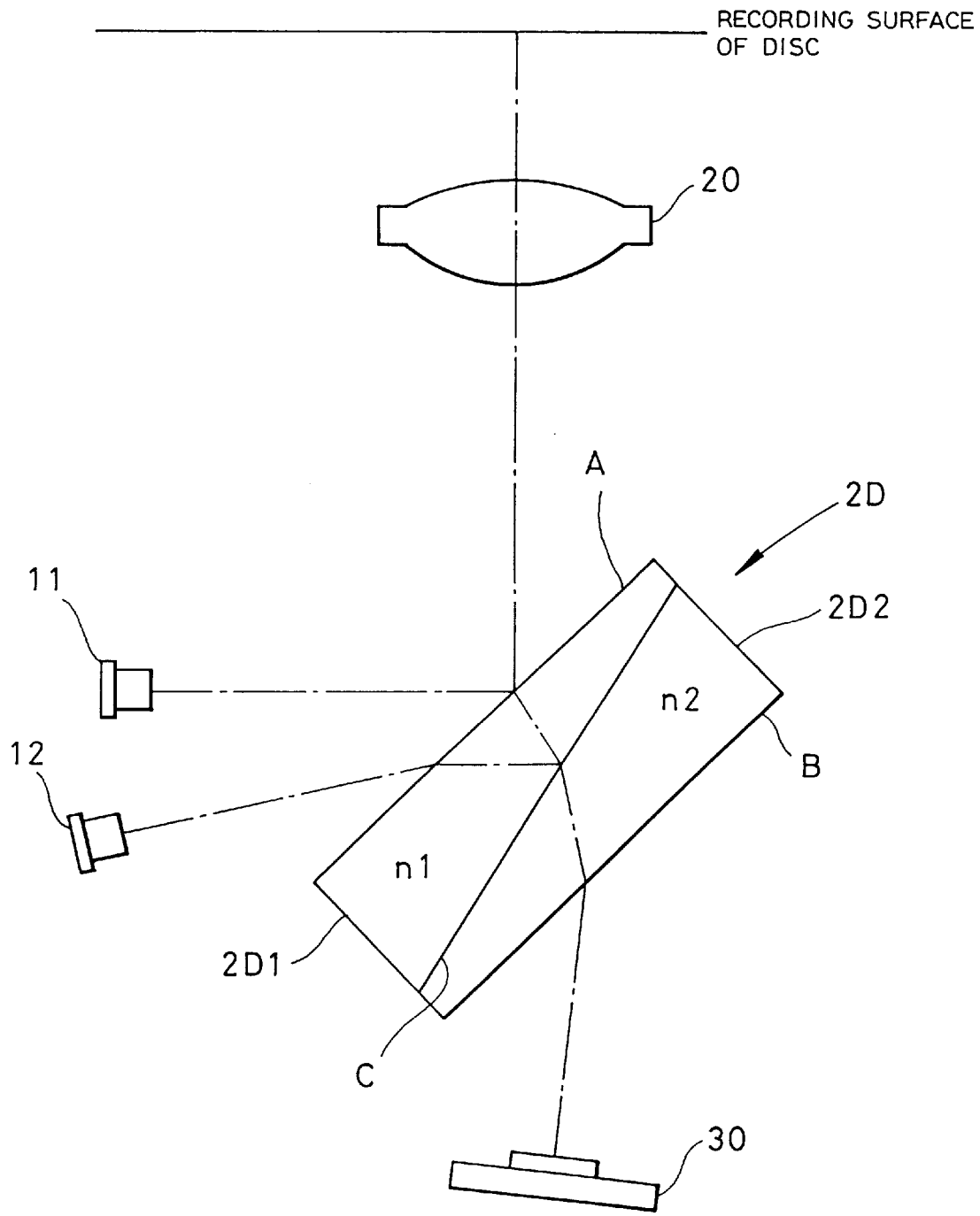
FIG. 18 is schematic diagram illustrating a general structure of an optical head device according to a yet further embodiment of the present invention.

FIG. 18 illustrates a structure according to a yet further embodiment of the present invention.

The illustrated structure is characterized by forming a modified wedge-shaped prism 2D of two optically transparent bodies. The prism 2D is formed by bonding a first optically transparent wedge-shaped body 2D1 having a refractive index n1 and a second optically transparent wedge-shaped body 2D2 having a refractive index n2. An external surface A (input surface) of the first optically transparent body 2D1 is positioned proximal to an objective lens 20, and an external surface B (output surface) of the second optically transparent body 2D2 is positioned proximal to a light receiving element 30. In addition, the two external surfaces A, B are arranged in parallel with each other, and bonded surfaces of the two optically transparent bodies are inclined by a predetermined angle to these external surfaces. As illustrated in FIG. 18, the first optically transparent body 2D1 and the second optically transparent body 2D2 are both trapezoidal in cross-section, and are further combined to be symmetrical to the center of the bonded surface in this embodiment.

It can be said that the basic optical actions so far described are similarly applied to the modified wedge-shaped prism 2D. Light emitted from a first laser diode 11 is reflected on the surface A and guided to a recording surface of a disc without aberration, whereas its return light is guided to the light receiving element 30 through the surfaces A, C, and B in this order. Although the return light transmits the first and second optically transparent wedge-shaped bodies, the combined shape of the two optically transparent bodies forms a parallel plate, i. e. , the surface A and B are in parallel with each other, so that the return light is guided to the light receiving element 30 with an astigmatism difference provided thereto. Light emitted from a second laser light 12, in turn, transmits the surface A, is reflected on the surface C, again transmits the surface A, and is guided to the recording surface of the disc. On an optical path traced by the light in this event, the emitted light can be basically maintained free of aberration due to the wedge shape of the first optically transparent body 2D1. Return light from the disc by the light emitted from the second laser diode 12 is guided to the light receiving element 30 through the surfaces A, C, B in this order, as is the case of the return light of the first laser diode 11, so that the return light is guided to the light receiving element 30 with an astigmatism difference provided thereto.

The refractive indices n1, n2 of the first and second optically transparent bodies 2D1, 2D2 may be set to an equal value to each other.

This embodiment can advantageously form a modified wedge-shaped prism responsible for optical actions to provide predetermined aberration or not in a relatively simple manner.

Figure 19:
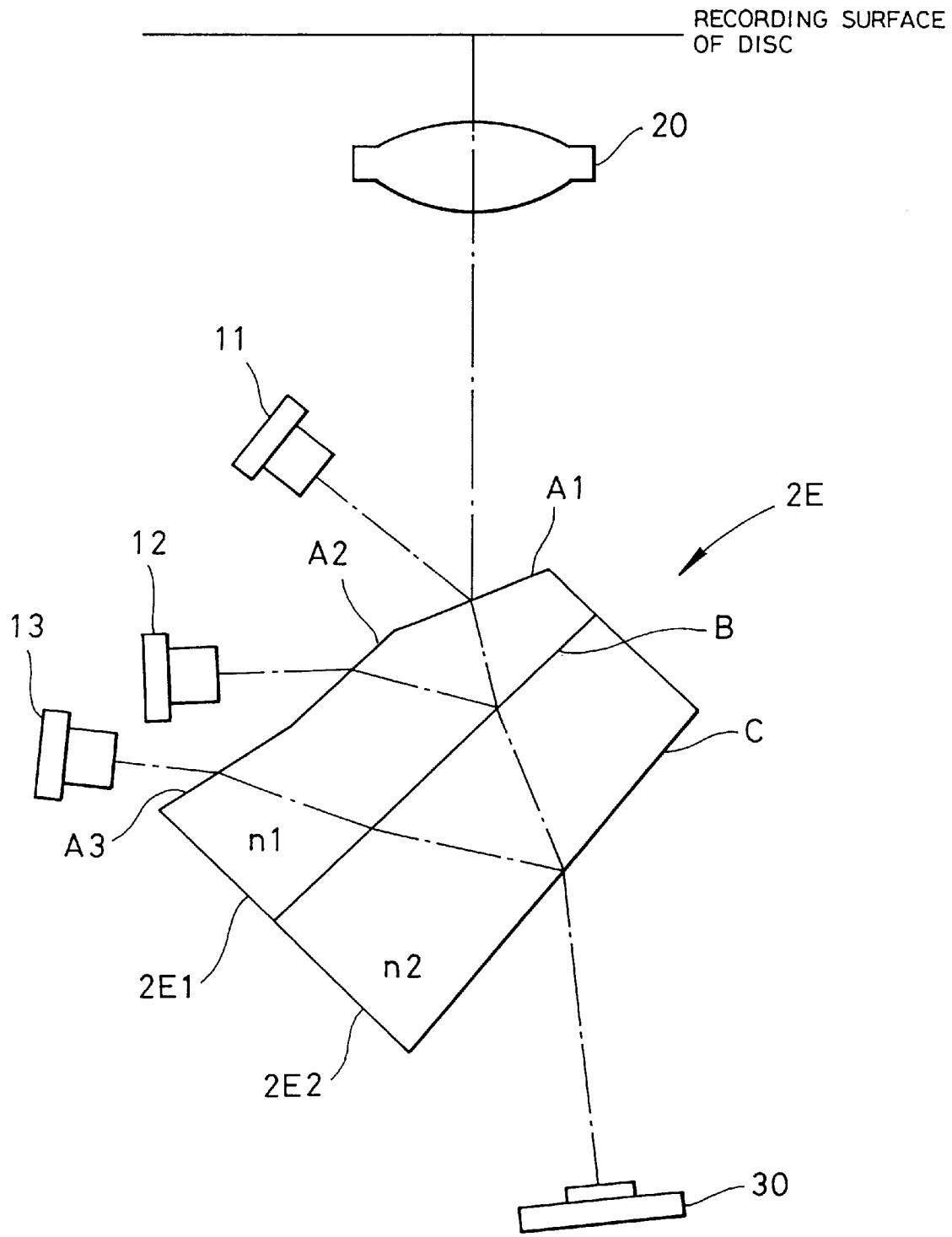
FIG. 19 is a schematic diagram illustrating a general structure of an optical head device using three light sources according to another embodiment of the present invention.

While the foregoing embodiments employ two light sources, a structure using three or more light sources is also possible. FIG. 19 illustrates an example of such a modification.

Referring specifically to FIG. 19, first—third laser diodes 11–13 are positioned proximal to an objective lens 20, and a multi-face incident type modified wedge-shaped prism 2E is formed by bonding a first optically transparent body 2E1 and a second optically transparent body 2E2. While the third laser diode 13 may be used for reading a type of disc different from DVD, CD, and CD-R, the third laser diode 13 is not limited to this specific use, but may be utilized in a particular write mode or read mode. It is therefore possible to determine its object as required.

The first optically transparent body 2E1 has a refractive index n1 and forms a surface A1 (first input surface) to which light emitted from the first laser diode 11 is incident, a surface A2 (second input surface) to which light emitted from the second diode 12 is incident, a surface A3 (third input surface) to which light emitted from the third laser diode 13 is incident, and a continuous flat surface C on the opposite side of these surfaces. The surfaces A1, A2, A3 are inclined at respective predetermined angles to the surface B, wherein the surface A1 is inclined to most rightly face the objective lens 20, the surfaces A1 and A2 are arranged at an angle to mutually form a ridge shape or a protrusion, and the surface A2 and A3 are arranged at an angle to mutually form a valley shape or a recess.

The second optically transparent body 2E2 is bonded to the first optically transparent body 2E1 on a bonded surface B, and forms a surface C (output surface), exposed to the side opposite to the surface B, i.e., exposed to the light receiving element 30.

The basic optical actions can be applied to this modified wedge-shaped prism 2E as is the case of the foregoing embodiments. Specifically, light emitted from the first laser diode 11 is reflected on the surface A1 and guided to a recording surface of a disc without aberration, while its return light is guided to the light receiving element 30 through the surfaces A1, B, and C in this order. In this event, the return light transmits the optically transparent wedge-shaped body formed of the surfaces A1 and C, and is provided with a predetermined astigmatism difference.

Light emitted from the second laser diode 12 transmits the surface A2, is reflected on the surface B, then transmits the surface A1, and is guided to the recording surface of the disc, while its return light is guided to the light receiving element 30 through the surfaces A1, B, and C in this order. On an optical path from the surface A2 to the surface A1, the optically transparent bodies 2E1, 2E2 are formed so as not to provide the emitted light with aberration, whereby the emitted light can be incident to the recording surface of the disc without aberration. Also, its return light transmits an optically transparent wedge-shaped body formed of the surfaces A1 and C, and is provided with a predetermined astigmatism difference in a similar manner.

Light emitted from the third laser diode 13 transmits the surface A3, is reflected on the surface C, then transmits the surfaces B and A1, and is guided to the recording surface of the disc, while its return light is guided to the light receiving element 30 through the surfaces A1, B, and C in this order. On an optical path from the surface A3 to the surface A1, the optically transparent bodies 2E1, 2E2 are formed so as not to provide the emitted light with aberration, whereby the emitted light can be incident to the recording surface of the disc without aberration. Also, its return light transmits an optically transparent wedge-shaped body formed of the surfaces A1 and C, and is provided with a predetermined astigmatism difference in a similar manner.

The refractive indices n1, n2 of the first and second optically transparent bodies 2E1, 2E2 may be set to a value equal to each other.

According to this embodiment, a modified wedge-shaped prism adapted to the use of three light sources can be formed and applied to a desired optical head device. It is also possible, based on a similar concept, to provide a modified wedge-shaped prism applicable even to four or more light sources and an optical head device employing such a prism.

For reference, exemplary optical characteristics selected for the respective surfaces of the prism 2E in an exemplary structure illustrated in FIG. 19 will be explained below.

The concept of the selection is to optimize the optical characteristics of the respective surfaces of the prism 2E to allow return light from a disc by the first and second laser beams to exhibit a maximum intensity on the light receiving element 30, similarly to the foregoing FIGS. 10–12 and FIGS. 14–16. Assume, as premises of calculations that the light reflectivity of the surfaces A1–A3 is RA, the reflectivity of the surface B is RB, the reflectivity of the surface C is RC, and the light intensity does not suffer from any loss on a disc.

Since a beam emitted from the first laser diode 11 traces a path: LD1→the surface A1 (reflection)→the recording surface of the disc (reflection)→the surface A1 (transmittance)→the surface B (transmittance)→the surface C (transmittance)→the light receiving element 30, a light intensity I1 on the light receiving element 30 is expressed by:

$$I1 = RA \times (1-RA) \times (1 \times RB) \times (1-RC) \quad (5)$$

Also, since a beam emitted from the second laser diode 12 trances a path: LD2→the surface A2 (transmittance)→the surface B (reflection)→the surface A1 (transmittance)→the recording surface of the disc (reflection)→the surface A1 (transmittance)→the surface B (transmittance)→the surface C (transmittance)→the light receiving element 30, a light intensity I2 on the light receiving element 30 is expressed by:

$$I2 = (1-RA) \times RB \times (1-RA) \times (1-RA)(1-RB)) \times (1-RC) \quad (6)$$

Since a beam emitted from the third laser diode 13 trances a path: LD3→the surface A3 (transmittance)→the surface B (transmittance)→the surface C (reflection)→surface B (transmittance)→the surface A1 (transmittance)→the recording surface of the disc (reflection)→the surface A1 (transmittance)→the surface B (transmittance)→the surface C (transmittance)→the light receiving element 30, a light intensity I3 on the light receiving element 30 is expressed by:

$$I3 = (1-RA) \times (1-RB) \times RC \times (1-RB) \times (1-RA) \times (1-RA) \times (1-RB) \times (1-$$

RC) (7)

Based on the equations (5)–(7), the optical characteristics of the surfaces A1, A2, A3, B, C can be determined.

Figure 20:
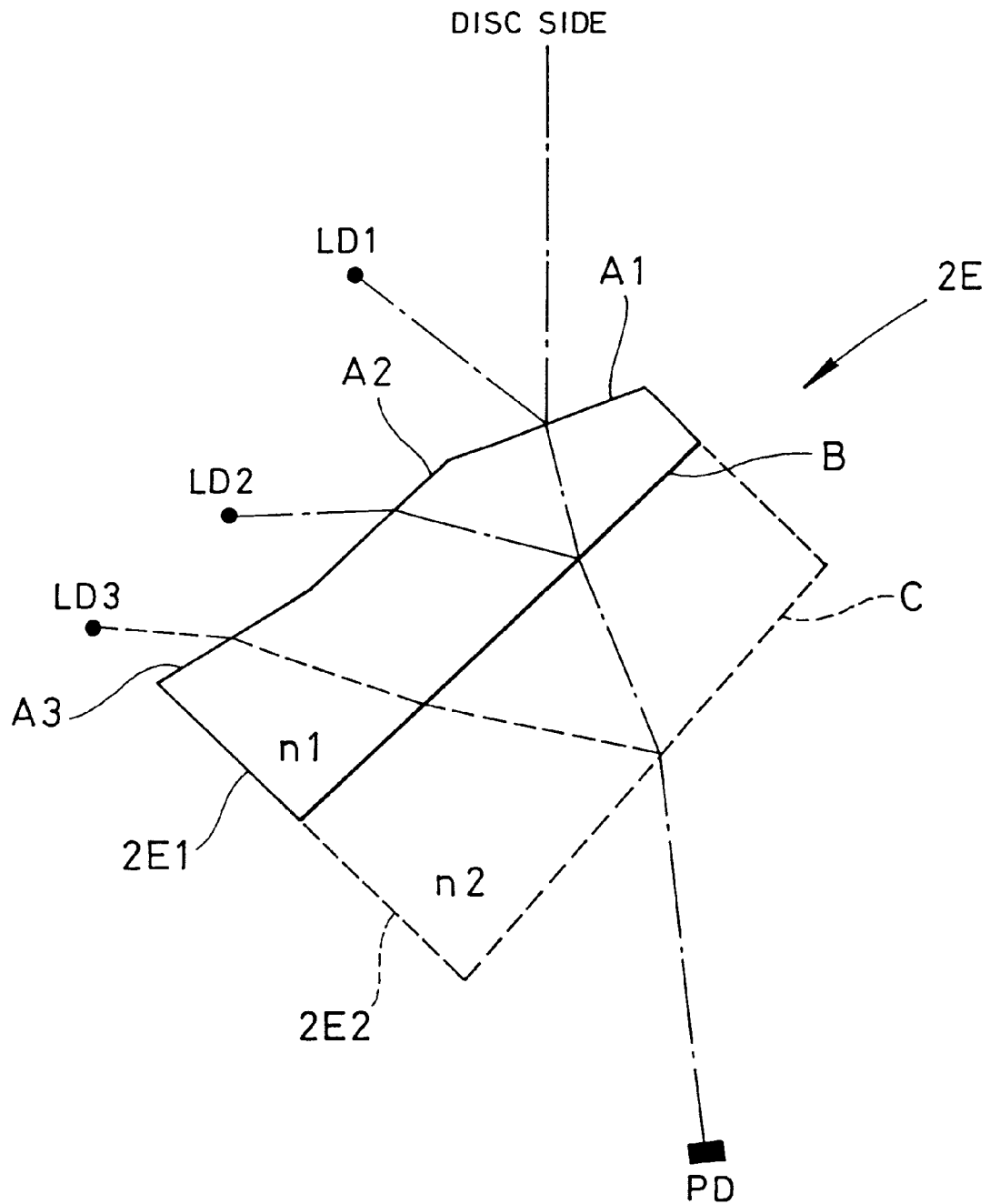
FIG. 20 is a schematic diagram illustrating a modified wedge-shaped prism and optical paths for explaining how the optical characteristics are selected in relation to first and second laser diodes on surfaces of the modified wedge-shaped prism in FIG. 19.

Alternatively, the optical characteristics may be determined in the following manner. The light emitted from the first and second laser diodes 11, 12 (LD1, LD2) and the return light thereof only transmit the surface C of the prism 2E. For this reason, if the surface C and the third laser diode 13 (LD3) are excluded (as indicated by broken lines) as illustrated in FIG. 20, optical paths traced by the emitted light of the first and second laser diodes 11, 12 and the return light are equivalent to those illustrated in the foregoing FIG. 13. Therefore, the specifications for the prism surfaces associated with the first and second laser diodes 11, 12 may be provided by adding a requirement of setting the reflectivity of the surface C to zero to the results shown in FIG. 16, as shown by #1 of FIG. 22.

Figure 21:
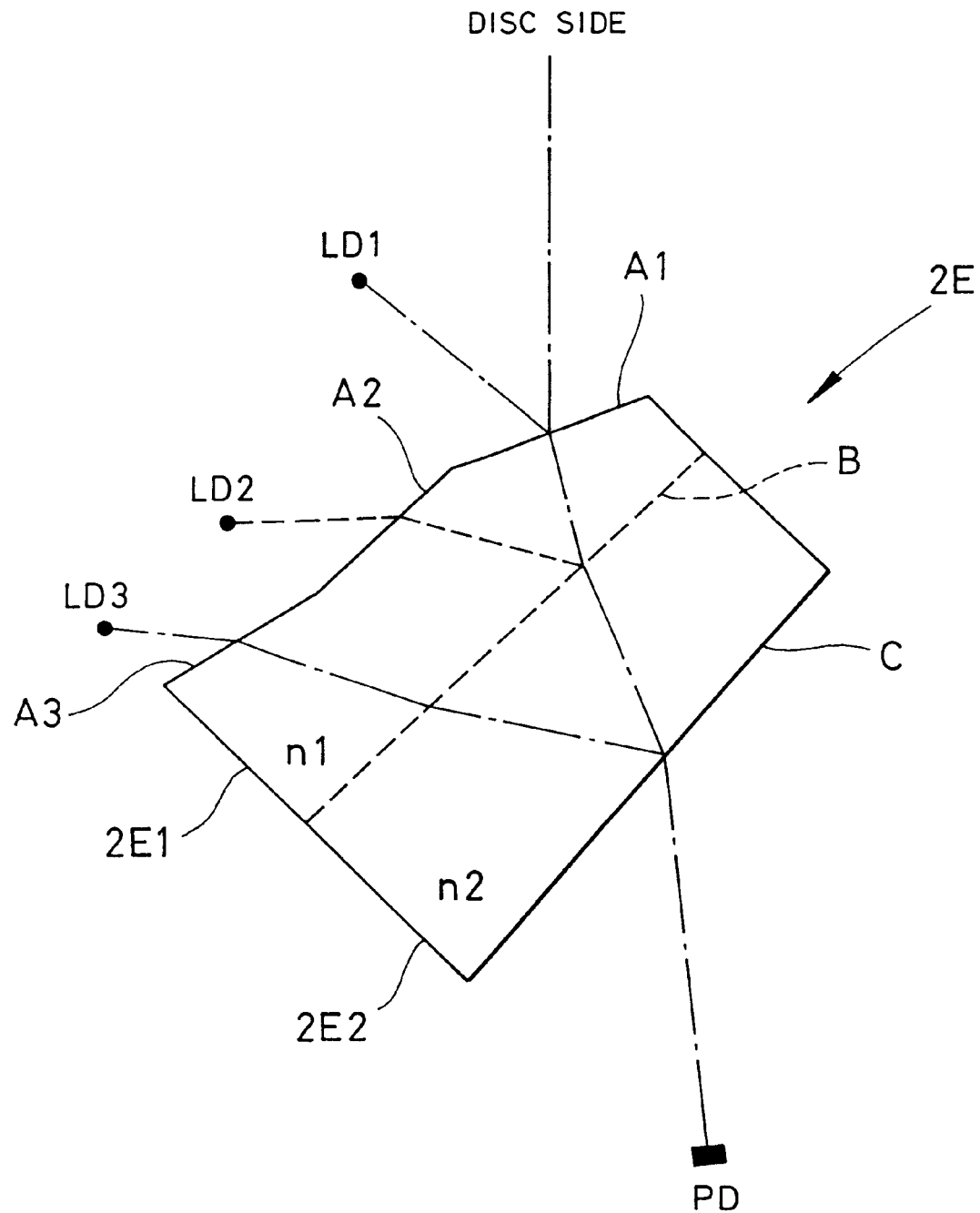
FIG. 21 is a schematic diagram illustrating a modified wedge-shaped prism and optical paths for explaining how the optical characteristics are selected in relation to first and third laser diodes on surfaces of the modified wedge-shaped prism in FIG. 19.

Likewise, the light emitted from the third laser diode 13 and the return light thereof only transmit the surface B of the prism 2E. For this reason, if the surface B is excluded (as indicated by a broken line) as illustrated in FIG. 21, optical paths traced by the emitted light of the first and third laser diodes 11, 13 and the return light are also equivalent to those illustrated in FIG. 13. Therefore, the specifications for the prism surfaces associated with the third laser diode 13 may be provided by replacing the specifications for the prism surfaces associated with the second laser diode 12 in FIG. 13 (RA=0, RB=0.5) as the specifications for the third laser diode 13 of this embodiment (RA=0, "RC"=0.5), and adding RB=0 (i.e., full transmittance), as shown by #2 of FIG. 22.

FIG. 22 shows a table which summarizes the foregoing discussions.

While the foregoing embodiments have been discussed in connection with an example in which light emitted from a CD laser diode is directly incident to a modified wedge-shaped prism, for simplifying the explanation, it is more practical to provide a restriction plate (opening restriction) 23, for example, as indicated by a broken line in FIG. 6, through which the emitted light is incident to the prism 2A. The restriction plate 23 is formed with a substantially circular hole in a central portion thereof for passing only a predetermined light flux therethrough. The restriction plate 23 functions to restrict the beam diameter of the light emitted from the laser diode 12 when CD or CD-R is read or written to reduce an apparent NA of the objective lens 20 and therefore increase the diameter of a beam spot irradiated to a recording surface of a disc. In this way, it is possible to create a light irradiating state optimal to CD and CD-R (as well as any other disc belonging to a so-called CD family) which basically have larger pits or recording marks. On the other hand, light emitted from the DVD laser diode 11 is guided to a disc without changing the NA since the objective lens 20 itself is generally set to an NA suitable to the emitted light of the DVD laser diode 11. The positioning of the restriction plate 23 as mentioned above, when considered in correspondence to the structure of FIG. 2, may be made between the laser diode 12 and the parallel plate beam splitter 22. Alternatively, a variety of approaches for changing the NA to be suitable to a particular disc can be thought in addition to the restriction plate, such as utilization of the aforementioned hologram, and so on, and an appropriate one may be selected therefrom.

Also, while the foregoing embodiments have been described in connection with an optical head device for reading and writing DVD, CD, and CD-R, the present invention is applicable to any other type of disc without being limited to them. For example, the present invention may be applied to an optical pickup device in a CD/DVD compatible player which does not support CD-R. In this case, since the optical pickup device employs a light source of 780 nm, essentially optimal to reading of CD, this is advantageous over the aforementioned prior art example which reads a CD with a light beam at 650 nm for DVD. Thus, the present invention may be applied to any optical head or pickup device which uses a plurality of light sources to read and write various types of discs.

Further, while the foregoing embodiments have been described in connection with structures comprising a small number of optical members, it goes without saying that additional optical parts be added to those structures to improve the performance.

Further, while a variety of embodiments have been described to specifically illustrate various shapes for the prism, a basic concept common to those embodiments lies in that a pickup or head device is provided with an integrated prism which guides each of light beams from beam emitting means incident thereto to a light converging optical system substantially without aberration and provides astigmatism aberration to return light reflected on a recording medium and incident thereto. Alternatively, as a means equivalent to the objective lens, another common light converging optical system may be employed for converging supplied light beams toward a disc recording medium.

Furthermore, while in the foregoing embodiments, various means have been described rather limitatively, they may be modified as desired as long as those skilled in the art may design such modifications.

As described above in detail, according to the present invention, it is possible to favorably perform irradiation of a plurality of independent light beams and reception of return light with a simple structure.

What is claimed is:

1. An optical pickup device comprising:
   beam emitting means for supplying at least two independent light beams;
   a common light converging optical system for converging the light beams from said beam emitting means to a recording medium;
   an integrated prism for guiding each of the light beams incident thereto from said beam emitting means to said light converging optical system substantially without aberration, and providing return light incident thereto from said recording medium with astigmatism; and
   light receiving means for receiving the return light provided with astigmatism by said prism.

2. An optical pickup device according to claim 1, wherein said light receiving means is a single light receiving element arranged to receive said at least two independent light beams reflected by said recording medium and passed through said integrated prism.

3. An optical pickup device comprising:
   beam emitting means for supplying at least two independent light beams;
   a common light converging optical system for converging the light beams from said beam emitting means to a recording medium;
   an integrated prism for guiding each of the light beams incident thereto from said beam emitting means to said light converging optical system, and guiding return light incident thereto from said recording medium; and
   light receiving means for receiving the return light,
   wherein said prism has at least two input surfaces corresponding to each of the light beams from said beam emitting means, to which these light beams are incident, and an output surface from which said return light is emitted, one of said at least two input surfaces is formed proximal to said light converging optical system, another of said at least two input surfaces is formed on the side opposite to said light converging optical system, and said output surface is formed proximal to said light converging optical system, and the one and the another of said input surfaces are not in parallel with each other.

4. An optical pickup device according to claim 2, wherein said one of said input surfaces and said output surface are arranged at an angle to form a ridge shape.

5. An optical pickup device according to claim 2, wherein: one of said at least two light beams from said beam emitting means is reflected on the one of said input surfaces and guided to said light converging optical system, another of said at least two light beams from said beam emitting means is transmitted through the another of said input surfaces and is guided to said light converging optical system, and said return light is reflected on the another of said input surfaces, is transmitted through said output surface, and is guided to said light receiving means.

6. An optical pickup device comprising:
beam emitting means for supplying at least two independent light beams;
a common light converging optical system for converging the light beams from said beam emitting means to a recording medium;
an integrated prism for guiding each of the light beams incident thereto from said beam emitting means to said light converging optical system, and guiding return light incident thereto from said recording medium; and
light receiving means for receiving the return light,
wherein said prism has at least two input surfaces corresponding to each of the light beams from said beam emitting means, to which these optical beams are incident, and an output surface from which said return light is emitted, the at least two in put surfaces are formed proximal to said light converging optical system, and said output surface is formed on the side opposite to said light converging optical system, and one of said at least two input surfaces and said output surface are not in parallel with each other.

7. An optical pickup device according to claim 6, wherein the at least two input surfaces are arranged at an angle to form a ridge shape.

8. An optical pickup device according to claim 6, wherein; one of said at least two light beams from said beam emitting means is reflected on the one of said at least two input surfaces and is guided to said light converging optical system, another of said at least two light beams from said beam emitting means is transmitted through another of said at least two input surfaces, is reflected on said output surface, is transmitted through the one of said input surfaces, and is guided to said light converging optical system, and said return light is transmitted through the one of said input surfaces and said output surface and is guided to said light receiving means.

9. An optical pickup device comprising;
beam emitting means for supplying at least two independent light beams,
a common light converging optical system for converging the light beams from said beam emitting means to a recording medium;
an integrated prism for guiding each of the light beams incident thereto from said beam emitting means to said light converging optical system, and guiding return light incident thereto from said recording medium; and
light receiving means for receiving the return light,
wherein said prism has at least two input surfaces corresponding to each of the light beams emitted from said beam emitting means, to which these light beams are incident, and an output surface from which said return light is emitted, the at least two input surfaces are formed proximal to said light converging optical system, and said output surface is formed on the side opposite to said light converging optical system, and the at least two input surfaces are arranged at an angle to form a valley shape.

10. An optical pickup device according to claim 9, wherein one of the at least two light beams from said beam emitting means is reflected on one of said at least two input surfaces and guided to said light converging optical system, another of the at least two light beams from said beam emitting means is transmitted through the another of said surfaces, is reflected on said output surface, is transmitted through the one of said input surfaces, and is guided to said light converging optical system, and said return light is transmitted through the one of said input surfaces and said output surface and is guided to said light receiving means.

11. An optical pickup device comprising:
beam emitting means for supplying at least two independent light beams;
a common light converging optical system for converging the light beams from said beam emitting means to a recording medium;
an integrated prism for guiding each of the light beams incident thereto from said beam emitting means to said light converging optical system, and guiding return light incident thereto from said recording medium; and
light receiving means for receiving the return light,
wherein said prism includes a first optically transparent body having a single input surface to which each of the beams from said beam emitting means is incident, and positioned proximal to said light converging optical system, and a second optically transparent body having an output surface from which said return light is emitted, positioned on the side opposite to said light converging optical system, and coupled to said first optically transparent body on a surface opposite to said output surface, and the coupled surfaces of said first optically transparent body and said second optically transparent body not being in parallel with said input surface and said output surface.

12. An optical pickup device according to claim 11, wherein one of the at least two light beams from said beam emitting means is reflected on said input surface and guided to said light converging optical system, another of the at least two light beams from said beam emitting means is transmitted through said input surface, is reflected on said coupled surfaces, is transmitted through said input surface, and is guided to said light converging optical system, and said return light is transmitted through said input surface, said coupled surfaces, and said output surface, and is guided to said light receiving means.

13. An optical pickup device comprising:
beam emitting means for supplying at least two independent light beams;
a common light converging optical system for converging the light beams from said beam emitting means to a recording medium;

an integrated prism for guiding each of the light beams incident thereto from said beam emitting means to said light converging optical system, and guiding return light incident thereto from said recording medium; and light receiving means for receiving the return light, wherein said prism includes a first optically transparent body having at least two input surfaces corresponding to each of the at least two light beams from said beam emitting means, to which these light beams are incident, and positioned proximal to said light converging optical system, and a second optically transparent body having an output surface from which said return light is emitted, positioned on the side opposite to said light converging optical system, and coupled to said first optically transparent body on a surface opposite to said output surface.

14. An optical pickup device according to claim 13, wherein said at least two input surfaces comprise first, second, and third input surfaces orderly formed adjacent to one another, said first input surface and said second input surface are arranged at an angle to form a ridge shape, and said second input surface and said third input surface are arranged at an angle to form a valley shape.

15. An optical pickup device according to claim 13, wherein a first light beam from said beam emitting means is reflected on the first input surface corresponding thereto and guided to said light converging optical system, a second light beam from said beam emitting means is transmitted through the second input surface corresponding thereto, is reflected on coupled surfaces of said first optically transparent body and said second optically transparent body, is transmitted through said first input surface, and is guided to said light converging optical system, a third light beam from said beam emitting means is transmitted through the third input surface corresponding thereto and said coupled surfaces, is reflected on said output surface, is transmitted through said coupled surfaces and said first input surface, and is guided to said light converging optical system, and said return light is transmitted through said first input surface, said coupled surfaces, and said output surface, and is guided to said light receiving means.

16. An optical pickup device comprising:

beam emitting means for supplying at least two independent light beams;

a common light converging optical system for converging the light beams from said beam emitting means to a recording medium;

an integrated prism for guiding each of the light beams incident thereto from said beam emitting means to said light converging optical system, and guiding return light incident thereto from said recording medium, said integrated prisim having at least two input surfaces corresponding to the at least two independent light beams; and light receiving means for receiving the return light, wherein said prism is defined with optical characteristics such that said light receiving means receives each of the at least two light beams from said beam emitting means substantially at a maximum level of intensity.

\* \* \* \* \*

UNITED STATES PATENT AND TRADEMARK OFFICE
CERTIFICATE OF CORRECTION

PATENT NO.   : 5,999,509
DATED        : December 7 1999
INVENTORS    : Satoshi SUGIURA et al.

It is certified that error appears in the above-identified patent and that said Letters Patent is hereby corrected as shown below:

\* Claim 6, Column 19, line 40, "in put" should read --input--.

Claim 9, Column 19, line 62, "comprising;" should read --comprising:--.

Signed and Sealed this

Twenty-second Day of May, 2001

Attest:

NICHOLAS P. GODICI

Attesting Officer        Acting Director of the United States Patent and Trademark Office